(12) United States Patent
Dotan-Cohen et al.

(10) Patent No.: US 11,340,963 B2
(45) Date of Patent: May 24, 2022

(54) AUGMENTATION OF NOTIFICATION DETAILS

(71) Applicant: MICROSOFT TECHNOLOGY LICENSING, LLC, Redmond, WA (US)

(72) Inventors: Dikla Dotan-Cohen, Herzliya (IL); Ido Priness, Herzliya (IL); Haim Somech, Ramat Gan (IL); Anat Inon, Redmond, WA (US); Amitay Dror, Redmond, WA (US); Michal Yarom Zarfati, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/242,270

(22) Filed: Jan. 8, 2019

(65) Prior Publication Data
US 2020/0218585 A1    Jul. 9, 2020

(51) Int. Cl.
*G06F 9/54* (2006.01)
*G06F 17/27* (2006.01)
(Continued)

(52) U.S. Cl.
CPC .......... *G06F 9/542* (2013.01); *G06F 40/253* (2020.01); *G06F 40/44* (2020.01)

(58) Field of Classification Search
None
See application file for complete search history.

(56) References Cited

U.S. PATENT DOCUMENTS

| 5,634,084 | A  | * | 5/1997  | Malsheen | G10L 13/08 704/260 |
| 8,588,825 | B2 | * | 11/2013 | Jonsson  | H04M 3/42382 455/466 |

(Continued)

FOREIGN PATENT DOCUMENTS

WO    2017003977 A1    1/2017

OTHER PUBLICATIONS

"International Search Report and Written Opinion Issued in PCT Application No. PCT/US2019/069029", dated Apr. 28, 2020, 10 Pages.

*Primary Examiner* — Umut Onat
(74) *Attorney, Agent, or Firm* — Shook, Hardy & Bacon, LLP

(57) ABSTRACT

Aspects of the technology described herein improve the clarity of information provided in automatically generated notifications, such as reminders, tasks, alerts or other messages or communications provided to a user. The clarity may be improved through augmentations that provide additional information or specificity to the user. For example, instead of providing a notification reminding the user, "remember to send the slides before the meeting," the user may be provided with a notification reminding the user "remember to send the updated sales presentation before the executive committee meeting on Tuesday. The augmentation may take several forms including substituting one word in the notification with another more specific word, adding additional content such as a word or phrase to the notification without altering the existing content, and/or by rephrasing the content for grammatical correctness and/or clarity.

18 Claims, 10 Drawing Sheets

(51) Int. Cl.
　　　*G06F 17/28*　　　(2006.01)
　　　*G06F 40/253*　　(2020.01)
　　　*G06F 40/44*　　　(2020.01)

(56) References Cited

U.S. PATENT DOCUMENTS

| | | | |
|---|---|---|---|
| 9,519,871 B1* | 12/2016 | Cardonha | G06F 16/3344 |
| 9,542,381 B2* | 1/2017 | Anisimovich | G06F 40/44 |
| 9,703,776 B2* | 7/2017 | Anisimovich | G06F 40/51 |
| 10,193,833 B2* | 1/2019 | Tetreault | G06F 40/169 |
| 10,303,761 B2* | 5/2019 | Yamauchi | G06F 40/151 |
| 10,467,339 B1* | 11/2019 | Shen | G06F 40/242 |
| 10,585,984 B2* | 3/2020 | Contreras | G06F 40/205 |
| 10,657,327 B2* | 5/2020 | Anders | G06F 40/30 |
| 10,713,423 B2* | 7/2020 | Catalano | G06F 40/253 |
| 10,762,161 B2* | 9/2020 | Rao | G06F 16/9577 |
| 2012/0242482 A1 | 9/2012 | Arulkumar et al. | |
| 2012/0316916 A1* | 12/2012 | Andrews | G06Q 40/08 |
| | | | 705/7.28 |
| 2015/0220515 A1* | 8/2015 | Anisimovich | G06F 40/268 |
| | | | 704/2 |
| 2016/0248865 A1* | 8/2016 | Dotan-Cohen | H04L 67/26 |
| 2017/0132187 A1* | 5/2017 | Contreras | G06F 40/205 |
| 2018/0006979 A1* | 1/2018 | Barsness | G06F 40/253 |
| 2018/0129993 A1 | 5/2018 | Chad et al. | |
| 2018/0373691 A1* | 12/2018 | Alba | G06F 40/247 |
| 2019/0073660 A1* | 3/2019 | Aung | G06F 16/285 |

\* cited by examiner

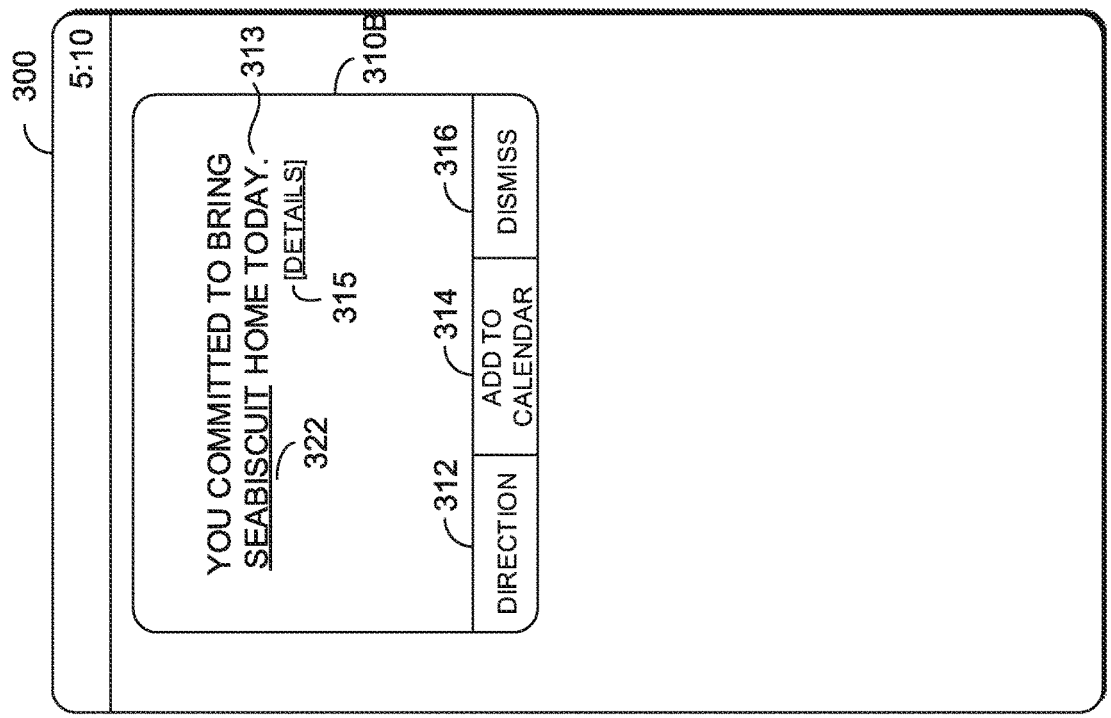
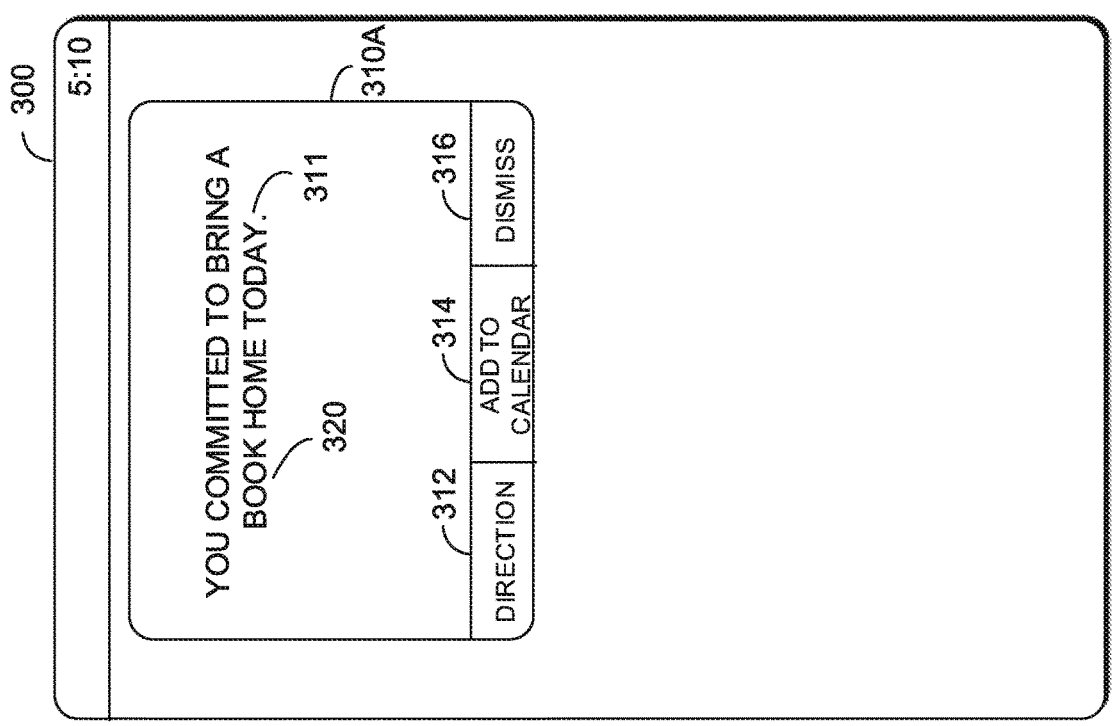
FIG. 3B
FIG. 3A

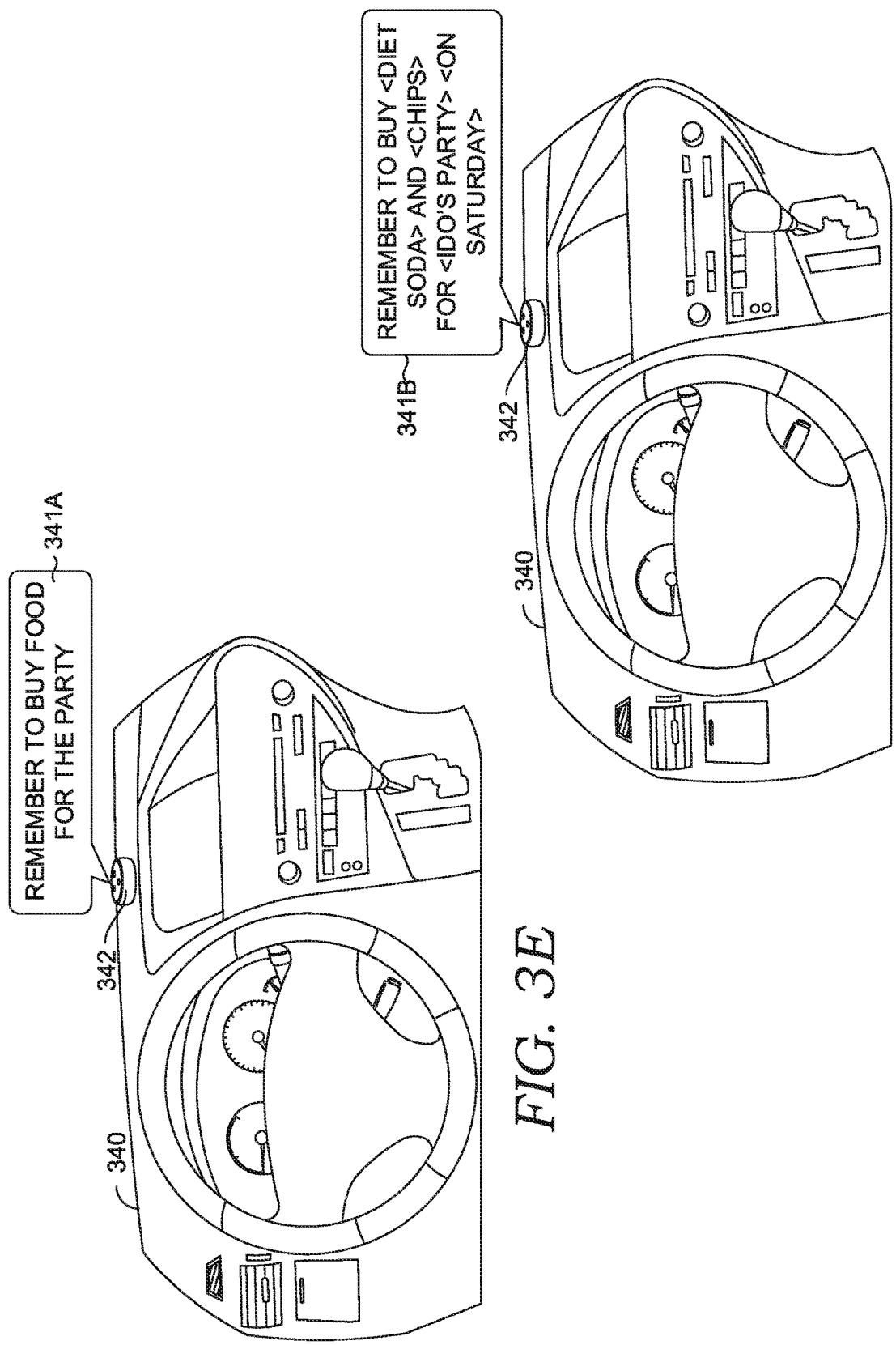

AUGMENTATION OF NOTIFICATION DETAILS

CROSS REFERENCE TO RELATED APPLICATIONS

BACKGROUND

Various computing applications strive to keep users informed about upcoming tasks, calendar entries, or other events through timely notifications. For example, some applications can update a calendar, provide reminders, track activities, and perform other functions to help the user stay organized and productive. Some applications can identify and track commitments made by a user and requests made of a user by monitoring user communications. The application can then provide a timely notification to the user reminding the user of the commitment or request. The notifications may be generated by extracting snippets from a communication. A snippet can lose the context of the communication from which it was extracted.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein improve the clarity of information provided in automatically generated notifications, such as reminders, tasks, alerts or other messages or communications provided to a user. The clarity may be improved through augmentations that provide additional information or specificity to the user. For example, instead of providing a notification reminding the user, "remember to send the slides before the meeting," the user may be provided with a notification reminding the user "remember to send the updated sales presentation before the executive committee meeting on Tuesday.

The augmentation may take several forms including substituting one word in the notification with another more specific word, adding additional content such as a word or phrase to the notification without altering the existing content, and/or by rephrasing the content for grammatical correctness and/or clarity.

Aspects of the technology can augment a notification content item that is automatically generated by a computing device using natural language processing and/or other techniques for extracting notification content from written or spoken communications. For example, a notification content may be, "buy skim milk on the way home from work tonight," which may be extracted from a text message. The notification content may be output to a user at an appropriate point in time or otherwise accessed by a user.

A co-referencing algorithm may be utilized to identify words (i.e., mentions) within a text document that refer to the same real world entity, property, or situation (e.g., a meeting) elsewhere in the document. The knowledge gained through the co-referencing analysis can be used to substitute a general mention (e.g., a pronoun) with a more specific mention, such as a proper name. However, conventional co-referencing technologies are designed to work on a single document, such as a news article. In particular, this technology does not effectively work on a series of unstructured communications, especially when the relevant mentions are spread across multiple communication channels (e.g., meeting requests, emails, and messaging apps) and/or multiple communication threads. In contrast, the embodiments of the technologies described herein improve upon the conventional technology by, among other things, having the capability to operate across multiple unstructured communications including different communication channels or communication threads.

BRIEF DESCRIPTION OF THE DRAWINGS

Aspects of the invention are described in detail below with reference to the attached drawing figures, wherein:

FIGS. 3A-G are illustrations of augmented notifications, in accordance with an aspect of the technology;

DETAILED DESCRIPTION

Figure 1:
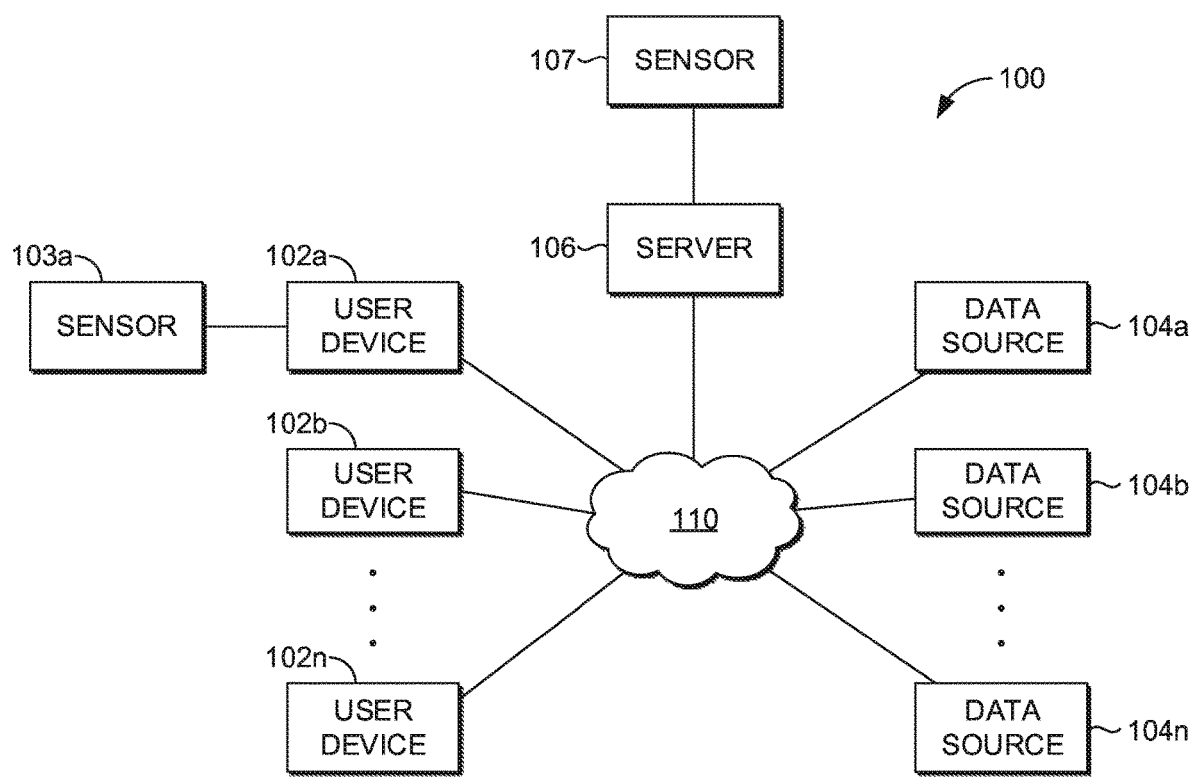
FIG. 1 is a block diagram of an example operating environment suitable for implementing aspects of the technology.

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein improve the clarity of information provided in automatically generated notifications, such as reminders, tasks, alerts or other messages or communications provided to a user. The clarity may be improved through augmentations that provide additional information or specificity to the user. For example, instead of providing a notification reminding the user, "remember to send the slides before the meeting," the user may be provided with a notification reminding the user "remember to send the updated sales presentation before the executive committee meeting on Tuesday.

The augmentation may take several forms including substituting one word in the notification with another more specific word, adding additional content such as a word or phrase to the notification without altering the existing content, and/or by rephrasing the content for grammatical correctness and/or clarity.

The term notification is used broadly herein and may comprise any information item or an indication of information that may be provided to a user, such as for example and without information a reminder, commitment, recommendation, suggestion, task item, task list, alert, calendar item, action item, summary, message or communication. The notification information (or notification content) may comprise one or more computer data records, which may be based on requests or commitments identified from unstructured communications, as described herein. In some embodiments, the notification content includes information about an item such as a task, or event associated with the user, such as textual description of the task. The notification content may also include information about a due date, reminder date, responsible party, other parties relevant to the item, associated information, such as the name of a project, group, committee, or meeting associated with the item, contact information for the parties, and other metadata that may facilitate a user response a notification.

Aspects of the technology can augment a notification content item that is automatically generated by a computing device using natural language processing and/or other techniques for extracting notification content from written or spoken communications. For example, a notification content may be, "buy skim milk on the way home from work tonight," which may be extracted from a text message. The notification content may be output to a user at an appropriate point in time or otherwise accessed by a user.

A notification may be provided to a user via a user interface, such as part of a textual message or visual alert, displayed on a graphical user interface, an audio communication provided over a speaker, which may include sound or speech conveying the notification content, tactile interface (e.g., vibration) or other appropriate computer-user interface.

Some embodiments include identifying requests and commitments from unstructured communications. Once identified, a commitment or request notification may be generated by extracting text from the unstructured communications. The notification is presented to the user at some point to remind the user of the commitment or request. For example, the email "That sounds fantastic! I'll meet you for lunch at noon this Thursday," might result in a commitment notification with the notification text "meet you for lunch at noon this Thursday." When notification text is generated by taking a snippet from the unstructured communication, then the context of the communication that gives it more meaning, such as the recipient of this email and, therefore, the person the user is meeting for lunch, is not easily discoverable. In the above example, the email chain may include the lunch location and other information that is not included in the notification by virtue of the automated method used to generate the notification text. Conventional techniques do not recognize when the lack of context in a communication makes the resulting notification less informative than it could be.

The technology described herein identifies notification content to which additional information can be added. The technology described herein generates a more informative notification by generating an updated notification that includes additional information in the notification. The information may be added by adding one or more words to the notification. The information may be added by replacing a first word in the text with a second word that has a more specific meaning. For example, a pronoun could be replaced with a corresponding proper noun. The grammar of the text could also be changed to add grammatical context to the notification text.

A co-referencing algorithm may be utilized to identify words (i.e., mentions) within a text document that refer to the same real world entity, property, or situation (e.g., a meeting) elsewhere in the document. The knowledge gained through the co-referencing analysis can be used to substitute a general mention (e.g., a pronoun) with a more specific mention, such as a proper name. However, conventional co-referencing technologies are designed to work on a single document, such as a news article. In particular, this technology does not effectively work on a series of unstructured communications, especially when the relevant mentions are spread across multiple communication channels (e.g., meeting requests, emails, and messaging apps) and/or multiple communication threads. In contrast, the embodiments of the technologies described herein improve upon the conventional technology by, among other things, having the capability to operate across multiple unstructured communications including different communication channels or communication threads.

For example, embodiments of the technologies described herein utilize domain knowledge to build a corpus of related communications to analyze for mentions. The domain knowledge is also used to identify and evaluate candidate replacement words that are not found in the communications. For example, names of files recently accessed by a user could be evaluated as candidate entities that could be used to clarify a notification text.

The technology described herein uses classification methods built using domain knowledge to identify a corpus of communications that may be related to a communication in which a commitment or request was identified. For example, if a commitment is identified in an email ("origin email") between a first user and a second user then all emails in an email chain including the origin email may be included in the corpus. As a variation, only emails in the chain sent within a time period, such as two weeks from the date of the origin email are included. Other communications, including texts between the first user and the second user may be added to the corpus. A subject matter similarity analysis between the origin email (or email chain) and other communications involving the user could be performed. Communications that satisfy a similarity threshold can be added to the corpus. These communications can be analyzed to identify candidate words using co-reference technology or other methods.

In one aspect, natural language processing of the communications within a domain including the user is performed to identify usage patterns. For example, the processing can extract usage patterns, such as what kinds or words are matched with "send." If the notification text includes the word "send" paired with "it," as in, "I'll send it," then the usage pattern can identify the types of objects that are commonly sent within the domain. A user may be associated with different domains, such as a work domain and a personal domain. In one aspect, the origin email is classified according to a domain and then the usage patterns associated with the domain are used to identify and/or evaluate candidates.

In addition to related communications, the one or more words to be added to a notification text can be identified in the user-data records associated with a user. The user-data records can include files, semantic information, calendar information, and other data associated with the user. The one or more words can be assigned an augmentation score using machine learning and added to the notification when the augmentation score satisfies various criteria described herein.

Initially, a notification can be analyzed to determine whether an augmentation criterion is satisfied. In one aspect, the augmentation criterion is whether any replacement candidates can be identified. For example, the criterion may be satisfied when multiple mentions of a word are found in the corpus of communications. Other criterion may be possible. The augmentation criterion is designed to identify a notification that can be made more informative. A notification can be more informative, as used herein, when one or more words within the notification could be replaced with a more specific word while retaining the original meaning of the notification text and/or one or more words could be added while retaining the original meaning of the notification text. As an example, an original notification text stating, "send it to Bob by Monday," could be made more informative by replacing "it" with "sales presentation." Accordingly, an updated notification could read, "send the sales presentation to Bob by Monday." It should be noted that both Bob and Monday could also be modified. A last name can be added to Bob and a specific Monday could be identified by adding a date. This additional context makes the notification more informative. In addition, a means by which the sales presentation is sent to Bob could be added. A completely updated notification could read, "email the sales presentation to Bob Brown by Monday, September 3."

The underlining in the above example illustrates that a word added to a notification can be annotated to indicate an origin outside of the original communication from which the notification is generated. The added words can be linked to additional information about their source, such as a separate communication thread, calendar, file usage, etc.

The technology describes herein can select a word not found in the corpus of communications or user data to augment the textual notification. This may occur when multiple candidate words have similar augmentation scores and/or when none of the candidate words has an augmentation score above a threshold. In this case, a broader word that describes multiple candidate words can be used. For example, if the names of several document files are strong candidate then the words "document file" could be used to replace "file" or "it," within a notification text.

In another example, the notification text is made more informative by grammatically updating the notification text. For example, a notification could be changed from the passive voice to the active voice.

An initial step can be to identify commitments and requests in textual communications (e.g., texts, chats, emails). Tasks can take the form of requests and commitments. The requests may be made by the user or of the user. The technology described herein will identify who made the request and of whom the request was made. This context is preserved and slightly different notifications may be generated for the requestor and request recipient. For example, a user may request that a friend pick him up for work or the friend may request that the user pick him up for work. Different notifications would be generated based on this difference. Similarly, the commitments may be made by the user or to the user by another person. For example, a user may commitment to complete a project or the user may receive a commitment from another person to complete a project. Many of the examples used herein describe the user making a commitment or receiving a request, but the technology can apply equally to the user making a request or receiving a commitment. The commitments and requests comprise notification content that describes the commitment or request.

Additionally, some aspects of the technology may be carried out by a personal assistant application or service, which may be implemented as one or more computer applications, services, or routines, such as an app running on a mobile device or in the cloud, as further described herein.

Turning now to FIG. 1, a block diagram is provided showing an operating environment 100 in which aspects of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 700, described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 7 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented.

Data sources 104a and 104b through 104n may comprise data sources and/or data systems, which are configured to make data available to any of the various constituents of operating environment 100, or system 200 described in connection to FIG. 2. (For example, in one aspect, one or more data sources 104a through 104n provide (or make available for accessing) user data to user-data collection component 214 of FIG. 2.) Data sources 104a and 104b through 104n may be discrete from user devices 102a and 102b through 102n and server 106 or may be incorporated and/or integrated into at least one of those components. In one aspect, one or more of data sources 104a through 104n comprises one or more sensors, which may be integrated into or associated with one or more of the user device(s) 102a, 102b, or 102n or server 106, or may be communicatively coupled to one or more of these devices, such as example sensors 103a and 107. Examples of sensed user data made available by data sources 104a through 104n are described further in connection to user-data collection component 214 of FIG. 2.

Figure 2:
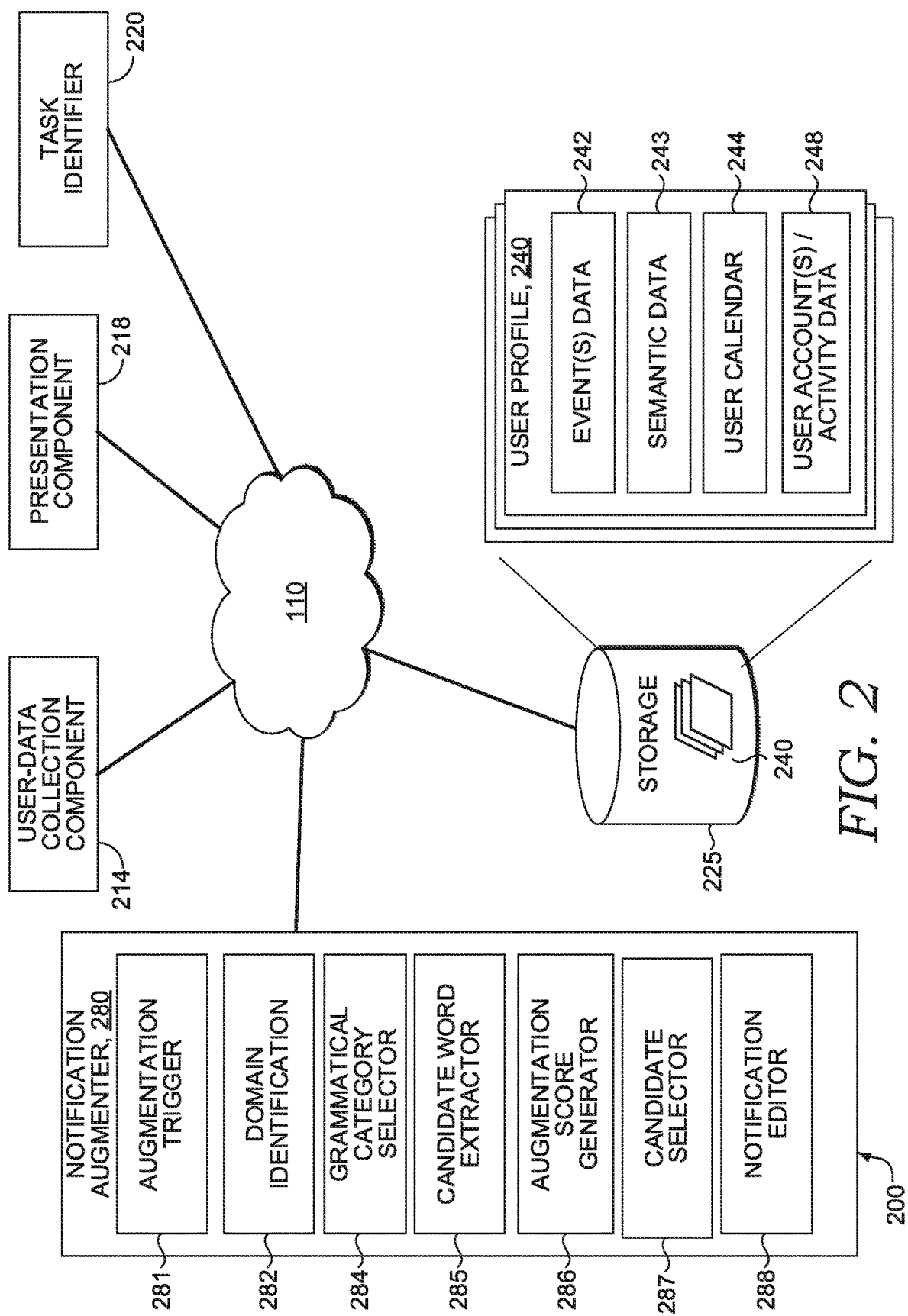
FIG. 2 is a diagram depicting an example computing architecture suitable for implementing aspects of the technology.

Operating environment 100 can be utilized to implement one or more of the components of system 200, described in FIG. 2, including components for collecting user data, monitoring communication events, generating modified notifications, and/or presenting notifications and related content to users.

Referring now to FIG. 2, with FIG. 1, a block diagram is provided showing aspects of an example computing system architecture suitable for implementing an aspect of the technology and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

At a high level, system 200 comprises a task identifier 220 that identifies tasks to be performed by a user. The tasks may be identified by analyzing user communications collected by user-data collection component 214. A preliminary notification is generated by extracting content from a communication or communications that describe the task. The preliminary notification can be analyzed by the notification augmenter 280. When an augmentation criterion is satisfied, then the notification augmenter 280 can generate an updated notification that includes one or more words that make the notification more informative.

Example system 200 includes network 110, which is described in connection to FIG. 1, and which communicatively couples components of system 200 including user-data collection component 214, notification augmenter 280, presentation component 218, task identifier 220, and storage 225. Notification augmenter 280 (including its components 281, 282, 284, 285, 286, 287, and 288), user-data collection component 214, task identifier 220, and presentation component 218 may be embodied as a set of compiled computer instructions or functions, program modules, computer software services, or an arrangement of processes carried out on one or more computer systems, such as computing device 700 described in connection to FIG. 7, for example.

In one aspect, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects, functionality of these components can be shared or distributed across other components.

Continuing with FIG. 2, user-data collection component 214 is generally responsible for accessing or receiving (and in some cases also identifying) user data from one or more data sources, such as data sources 104a and 104b through 104n of FIG. 1. In particular, the user-data includes user communications, such as emails, social posts, and texts. The communications can also include audio content from virtual meetings. In some aspects, user-data collection component 214 may be employed to facilitate the accumulation of user data of one or more users (including crowdsourced data) for notification augmenter 280. The data may be received (or accessed), and optionally accumulated, reformatted, and/or combined, by data collection component 214 and stored in one or more data stores such as storage 225, where it may be available to notification augmenter 280 and task identifier 220. For example, the user data may be stored in or associated with a user profile 240, as described herein.

In some embodiments, a user may opt into or out of services provided by the technologies described herein and/or select which user data and/or which sources of user data are to be utilized by these technologies. For example, one embodiment comprises a user-data dashboard output for display as a graphical user interface, which may be presented via presentation component 218. The dashboard may present details about specific user data utilized, and may facilitate enabling a user to view, modify, and/or delete their user data. Similarly, the dashboard may allow users to view, modify, and/or block access to user-data sources. In some embodiments, the user may optionally view user-data-related details about the user's commitments and requests, such as which user-data source was used to generate a particular commitment notification. Moreover, in one embodiment, a user may be presented with near-real-time changes to their notifications based on the user-data sources that are selected to be utilized by the technologies described herein. For instance, as the user selects specific user-data sources for inclusion (or exclusion), then the notifications generated or augmented using the sources might change. By comparing the amount and quality of notifications generated using different data sources, the user might be encouraged to select more user-data sources for inclusion, as the accuracy of the augmented notifications is likely to improve as more user-data sources are included. Moreover, in some aspects, the user may be presented with an option to "correct" or update information to better tune the data.

User data may be received from a variety of sources where the data may be available in a variety of formats. For example, in some aspects, user data received via user-data collection component 214 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. User data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user data associated with events; etc.) including user activity that occurs over more than one user device, user history, session logs, application data, contacts data, calendar and schedule data, notification data, social-network data, news (including popular or trending items on search engines or social networks), online gaming data, ecommerce activity (including data from online accounts such as Amazon.com®, eBay®, PayPal®, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a BLUETOOTH headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein. In some respects, user data may be provided in user signals. A user signal can be a feed of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some aspects, user-data collection component 214 receives or accesses data continuously, periodically, or as needed.

The task identifier 220 analyzes user data to identify user tasks and generate reminder notifications for those tasks. The task identifier 220 can perform several tasks including extraction of tasks from electronic communications, such as messages between or among one or more users (e.g., a single user may send a message to oneself or to one or more other users). For example, an email exchange between two people may include text from a first person sending a request to a second person to perform a task, and the second person making a commitment (e.g., agreeing) to perform the task. The email exchange may convey enough information for the system to automatically determine the presence of the request to perform the task and/or the commitment to perform the task. In some implementations, the email exchange does not convey enough information to determine the presence of the request and/or the commitment. Whether or not this is the case, the system may query other sources of information that may be related to one or more portions of the email exchange. For example, the system may examine other messages exchanged by one or both of the authors of the email. The system may also examine email and other messages of which only one of the parties on the original email is associated with. Beyond other messages, the system may query a calendar or database of one or both of the authors of the email exchange for additional information.

Herein, "extract" is used to describe determining or identifying a request or commitment in a communication. For example, a system may extract a request or commitment from a series of text messages. Here, the system is determining or identifying a request or commitment from the series of text messages, but is not necessarily removing the request or the commitment from the series of text messages. The extracted text may be used to generate a user notification.

Herein, a process of extracting a request and/or commitment from a communication may be described as a process of extracting "task content." In other words, "task content" as described herein refers to one or more requests, one or more commitments, and/or projects comprising combinations of requests and commitments that are conveyed in the meaning of the communication. In various implementations, interplay between commitments and requests may be identified and extracted. Such interplay, for example, may be where a commitment to a requester generates one or more requests directed to the requester and/or third parties (e.g., individuals, groups, processing components, and so on.) For example, a commitment to a request from an engineering manager to complete a production yield analysis may generate secondary requests directed to a manufacturing team for production data.

In various implementations, a process may extract a fragment of text containing a commitment or request. For example, a paragraph may include a commitment or request in the second sentence of the paragraph. Additionally, the process may extract the text fragment, sentence, or paragraph that contains the commitment or request, such as the third sentence or various word phrases in the paragraph and use this text to generate a notification.

In various implementations, a process may augment extracted task content (e.g., requests or commitments) with identification of people and one or more locations associated with the extracted task content. For example, an extracted request may be stored or processed with additional information, such as identification of the requester and/or "requestee(s)," pertinent location(s), times/dates, and so on.

Once identified and extracted by a computing system, task content (e.g., the proposal or affirmation of a commitment or request) of a communication may be further processed or analyzed to identify or infer semantics of the commitment or request including: identifying the primary owners of the request or commitment (e.g., if not the parties in the communication); the nature of the task content and its properties (e.g., its description or summarization); specified or inferred pertinent dates (e.g., deadlines for completing the commitment or request); relevant responses such as initial replies or follow-up messages and their expected timing (e.g., per expectations of courtesy or around efficient communications for task completion among people or per an organization); and information resources to be used to satisfy the request. Such information resources, for example, may provide information about time, people, locations, and so on. The identified task content and inferences about the task content may be used to drive automatic (e.g., computer generated) services such as reminders, revisions (e.g., and displays) of to-do lists, appointments, meeting requests, and other time management activities. In some examples, such automatic services may be applied during the composition of a message (e.g., typing an email or text), reading the message, or at other times, such as during offline processing of email on a server or client device. The initial extraction and inferences about a request or commitment may also invoke automated services that work with one or more participants to confirm or refine current understandings or inferences about the request or commitment and the status of the request or commitment based, at least in part, on the identification of missing information or of uncertainties about one or more properties detected or inferred from the communication.

In some examples, task content may be extracted from multiple forms of communications, including digital content capturing interpersonal communications (e.g., email, SMS text, instant messaging, phone calls, posts in social media, and so on) and composed content (e.g., email, note-taking and organizational tools, such as OneNote® by MICROSOFT Corporation of Redmond, Wash., word-processing documents, and so on).

As described below, some example techniques for identifying and extracting task content from various forms of electronic communications may involve language analysis of content of the electronic communications, which human annotators may annotate as containing commitments or requests. Human annotations may be used in a process of generating a corpus of training data that is used to build and to test automated extraction of commitments or requests and various properties about the commitments or requests. Techniques may also involve proxies for human-generated labels (e.g., based on email engagement data or relatively sophisticated extraction methods). For developing methods used in extraction systems or for real-time usage of methods for identifying and/or inferring tasks or commitments and their properties, analyses may include natural language processing (NLP) analyses at different points along a spectrum of sophistication. For example, an analysis having a relatively low-level of sophistication may involve identifying key words based on simple word breaking and stemming An analysis having a relatively mid-level of sophistication may involve consideration of larger analyses of sets of words ("bag of words"). An analysis having a relatively high-level of sophistication may involve sophisticated parsing of sentences in communications into parse trees and logical forms. Techniques for identifying and extracting task content may involve identifying attributes or "features" of components of messages and sentences of the messages. Such techniques may employ such features in a training and testing paradigm to build a machine learning model to classify components of the message. For example, such components may comprise sentences or the overall message as containing a request and/or commitment and also identify and/or summarize the text that best describes the request and/or commitment to form a preliminary notification.

In some examples, techniques for extraction may involve a hierarchy of analysis, including using a sentence-centric approach, consideration of multiple sentences in a message, and global analyses of relatively long communication threads. In some implementations, such relatively long communication threads may include sets of messages over a period of time, and sets of threads and longer-term communications (e.g., spanning days, weeks, months, or years). Multiple sources of content associated with particular communications may be considered. Such sources may include histories and/or relationships of/among people associated with the particular communications, locations of the people during a period of time, calendar information of the people, and multiple aspects of organizations and details of organizational structure associated with the people.

In some examples, techniques may directly consider requests or commitments identified from components of content as representative of the requests or commitments, or may be further summarized. Techniques may extract other information from a sentence or larger message, including relevant dates (e.g., deadlines on which requests or commitments are due), locations, urgency, time-requirements, task subject matter (e.g., a project), and people. In some implementations, a property of extracted task content is determined by attributing commitments and/or requests to particular authors of a message. This may be particularly useful in the case of multi-party emails with multiple recipients, for example.

Beyond text of a message, techniques may consider other information for extraction and summarization, such as images and other graphical content, the structure of the message, the subject header, length of the message, position of a sentence or phrase in the message, date/time the message was sent, and information on the sender and recipients of the message, just to name a few examples. Techniques may also consider features of the message itself (e.g., the number of recipients, number of replies, overall length, and so on) and the context (e.g., day of week). In some implementations, a technique may further refine or prioritize initial analyses of candidate messages/content or resulting extractions based, at least in part, on the sender or recipient(s) and histories of communication and/or of the structure of the organization.

In some examples, techniques may include analyzing features of various communications beyond a current communication (e.g., email, text, and so on). For example, techniques may consider interactions between or among commitments and requests, such as whether an early portion of a communication thread contains a commitment or request, the number of commitments and/or requests previously made between two (or more) users of the communication thread, and so on.

In some examples, a computing system may construct predictive models for identifying and extracting requests and commitments and related information using machine learning procedures that operate on training sets of annotated corpora of sentences or messages (e.g., machine learning features). In other examples, a computing system may use a rule-based approaches to perform extractions and summarization.

In various implementations, a computing system may extract requests and commitments from audio feeds, such as from phone calls or voicemail messages, SMS images, instant messaging streams, and verbal requests to digital personal assistants, just to name a few examples.

The task identifier 220 use semantic data 243 about the user to generate task reminders. The semantic data 243 can include detailed information about the user, such as the user's relationship to other users and the names and online or electronic identification information for the related users. For example, the knowledge base may identify a user's spouse, parents, children, coworkers, neighbors, or other groups of people. The user-specific knowledge base may also include information about the user's interests, activities, and other relevant information. The user-specific data store can include a user's home location and frequent locations visited, such as shopping locations, restaurants, entertainment locations, and such. The user-specific data store can include information about the user's work location and hierarchical job information, such as the user's manager and who directly reports to the user. Hierarchical work information can help identify whether a task is important as well as its urgency. For example, an apparent request from the user's manager may be more urgent and important than a request received from a coworker.

The semantic data 243 can also include communication histories between people. The communication histories can quantify various communication characteristics that can help identify tasks and establish ideal reminder times. The communication characteristics can include a number of messages received from a person, number of messages sent to a person, frequency of response to a person, and average response time to a person. As an example, the average response time could be used to set a time to present a reminder for a task of responding to a message. The response frequency could be used to determine whether or not a request to respond to a message should be listed as a task.

Notification augmenter 280 is generally responsible for augmenting notifications generated by task identifier 220. As shown in example system 200, notification augmenter 280 comprises an augmentation trigger 281, a domain identification component 282, a grammatical category selector 284, a candidate word extractor 285, augmentation score generator 286, a candidate selector 286, and a notification editor 288.

The augmentation trigger 281 identifies notifications that satisfy an augmentation criterion. The augmentation trigger 281 can be rules-based, machine learning based, or use a combination of the two. A machine learning based augmentation trigger 281 can assign a classification to a notification as suitable for augmentation. When the machine learning method assigns a notification as suitable then criterion is satisfied. The machine learning method can be trained using human annotated notifications. The human annotated notifications can be given an augmentation score. The machine learning mechanism is then trained using the human annotated notifications and is able to assign a score to an unlabeled notification when fully trained. Use of different machine learning-processes are possible in different aspects, including supervised learning processes (e.g., decision tree, random forest, logistic regression), unsupervised learning (e.g., apriori algorithm, K-means), or reinforcement learning.

The rules-based approach can look for specific keywords or the absence of certain words in the presence of other words to determine that a trigger criteria is satisfied. For example, the presence of a pronoun or common noun in the notification can trigger the augmentation criteria. The presence of a first name without a last name or a day without a date may satisfy the augmentation criteria.

A domain identification component 282 identifies a domain for the notification. The notification's domain may be used to identify candidate words for evaluation. In one aspect, domain specific augmentation scores are used by augmentation score generator 286 to assign augmentation scores to candidate words. Use of different machine learning-processes are possible in different aspects, including supervised learning processes (e.g., decision tree, random forest, logistic regression), unsupervised learning (e.g., apriori algorithm, K-means), or reinforcement learning. In each case, the notificationcontent and other information associated with the notification is used as an input to determine the notification domain. For example, a corpus of notification information may be manually scored or labeled according to domain (e.g., work, social, hobby). A machine classification system trained on the corpus of labeled information could use natural language processing to assign a domain to an unlabeled notification.

Alternatively, the domain could be identified using rules, such as keyword identification.

A grammatical category selector 284 identifies a grammatical category for a word to be added to the notification. In one aspect, a grammatical analysis can be used to determine the grammatical category of a word to be added. For example, if the original notification lacks an object, then the grammatical category of the object, for example, a person, place, or thing may be determined. In one aspect, the grammatical category is determined using a machine learning method. A corpus of exemplary notifications is provided to the machine learning system for training purposes. The grammatical category of each word in the notification may be noted in the training data. The machine learning system can identify grammatical patterns that commonly occur in notifications. Using this understanding, the most likely grammatical category for a word to be added to a notification can be determined taking the existing notification as input.

In one aspect, various rules are used to look for words in the grammatical category that may be suitable for inclusion in the notification. For example, an augmentation rule used to satisfy the augmentation criteria can be used to identify specific words to look for. For example, if the word "file" is mentioned in the notification, then names of various files accessible by the user can be retrieved as candidates. Words grammatically classified as a thing (e.g., file) may be selected, while all others are excluded. Similarly, if a person's last name is absent from the notification and every last name that goes with a known first name in the notification can be extracted from the user's contact list, emails, social network, or other data source. In this case, the grammatical category would be proper name.

A candidate word extractor 285 identifies words for evaluation. Domain information, grammatical category, frequency of use, and other criteria may be used to select words for further evaluation. The candidate word extractor may crawl a corpus of information associated with a user and extract words for further evaluation.

The augmentation score generator 286 assigns an augmentation score to one or more words selected by the candidate word extractor 285. Use of different machine learning-processes are possible in different aspects, including supervised learning processes (e.g., decision tree, random forest, logistic regression), unsupervised learning (e.g., apriori algorithm, K-means), or reinforcement learning. In each case, information about the word, notification, user, and related context can be used as an input to determine the augmentation score. The machine learning process is first trained. For example, a corpus of information may be manually scored or labeled along an augmentation score spectrum by people. A machine learning system trained on the corpus of labeled information could use natural language processing to assign a score along the same augmentation score spectrum to an unlabeled candidate word.

The candidate selector 286 selects the candidate word for inclusion in an updated notification. Various methods can be used to select the word. In one aspect, the word with the highest score is selected. In another aspect, the word with the highest score is only selected when the augmentation score for the word satisfies an augmentation threshold. The augmentation threshold can represent a confidence that the word goes with the notification. The use of an augmentation threshold can prevent the addition of a word to a notification that may be inaccurate and actually make the notification worse. For example, it would be better not to add the wrong last name to the notification then to leave it as is. The augmentation threshold can serve as a gatekeeper to make sure words are only added to a notification when there is a higher confidence level that the word belongs in the notification.

In another aspect, the word with the highest score is only selected when no other word has an augmentation score within a threshold range from the word's augmentation score. In some aspects, two or more words may seem to fit into the context of a notification. For example, a user may work with three different men named Bob. A notification for a work related task deliverable to Bob could be identified augmentable for lacking a last name. However, the presence of multiple candidate last names may cause similar augmentation scores to be given to one or more of the candidate last names. Even if both of the scores exceed the threshold, neither may be selected when the two scores are similar (e.g., within a range that defines "similar") because uncertainty can exist as to which word to add to the notification.

Various actions can be taken in response to determining that two or more words are viable candidates to make a notification more informative. If both words are names for the same type of object, such as a presentation file (e.g., December business plan presentation and November business plan presentation), then the object can be used instead of the two words to augment a notification. In this example, presentation or presentation file could be used as the word.

In one aspect, a single word that encompasses the meaning of both words is selected if it is more informative than the original word in the notification. For example, in the original notification to "send it to Bob," "it" could be referring to either a March 1 presentation or a March 15 presentation. In this example, the word "presentation" is more descriptive than "it" and encompasses the meaning of both the March 1 presentation and the March 15 presentation. In this case, the notification could be updated to read, "send the presentation to Bob."

As a variation, the two specific words could be added as a parenthetical. The updated notification including the parenthetical could read, "send the presentation (March 1 presentation or March 15 presentation) to Bob." The user is then alerted that some uncertainty exists as to the meaning of "presentation." In one aspect, the two options (March 1 presentation or March 15 presentation) are selectable. Upon receiving a user selection of an option, the notification can be updated. For example, upon selection of March 15, the notification can be updated to read, "send the March 15 presentation to Bob." Notifications that include selectable options could be highlighted, or otherwise visually set apart, within a task management interface.

The notification editor 288 can provide different words for an updated notification depending on whether a person receiving a notification is the sender or receiver of a communication that resulted in the notification. For example, the email, "I'll send it to you by Tuesday" sent from Sarah to Bob may cause different augmented notifications to be generated for Sarah and Bob. Sarah's augmented notification could read, "You should send the presentation to Bob by Tuesday." Meanwhile, Bob's augmented notification could read, "Sarah should send the presentation to you by Tuesday."

The notification editor 288 generates an updated notification by adding the selected word to the notification. The selected word may be added by substitution or addition. For example, a pronoun may be substituted for a common noun or a proper noun. Similarly, a common noun may be substituted for a proper noun. In other examples, the word is added without subtracting existing words. For example, if the word is a person's last name when the first name is already in the notification then the last name may simply be added. The added words may be annotated, as described with reference to FIG. 3. Upon selecting one of the added words, additional information such as the source material from which the word was extracted, may be shown to the user.

The notification editor 288 can change the grammatical construction of a notification content to agree with new words added. For example, when adding a subject to a notification text the sentence could be changed from passive to active voice. In another example, the notification editor 288 changes the grammar without changing other words to make the notification content more readable. For example, a notification could be changed from the passive voice to the active voice.

Example system 200 also includes a presentation component 218 that is generally responsible for presenting notifications and related content to a user. Presentation component 218 may comprise one or more applications or services on a user device, across multiple user devices, or in the cloud. For example, in one aspect, presentation component 218 manages the presentation of notification content to a user across multiple user devices associated with that user.

In some aspects, presentation component 218 generates user interface features associated with a notification. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

As described previously, in some aspects, a personal assistant service or application operating in conjunction with presentation component 218 determines when and how to present the notification. In such aspects, the notification content may be understood as a recommendation to the presentation component 218 (and/or personal assistant service or application) for when and how to present the notification, which may be overridden by the personal assistant application or presentation component 218.

Example system 200 also includes storage 225. Storage 225 generally stores information including data, computer instructions (e.g., software program instructions, routines, or services), and/or models used in aspects of the technology described herein. In an aspect, storage 225 comprises a data store (or computer data memory). Further, although depicted as a single data store component, storage 225 may be embodied as one or more data stores or may be in the cloud.

In an aspect, storage 225 stores one or more user profiles 240, an example aspect of which is illustratively provided in FIG. 2. Example user profile 240 may include information associated with a particular user or, in some instances, a category of users. As shown, user profile 240 includes event(s) data 242, semantic data 243, calendar data 244, and user account(s) data 248. The information stored in user profile 240 may be available to the routines or other components of example system 200. The semantic data 243 can include information about the user, such as home address, family relations, work relations, and other profile information.

The user calendar 244 can be used for a number of reasons. The calendar information can be from one or more user calendars, such as office calendars, personal calendars, social media calendars, or even calendars from family members or friends of the user, in some instances. Some aspects of the technology may construct a complementary or shadow calendar for a user for use in determining interaction probability. In particular, in such aspects, the complementary or shadow calendar may be used for determining who in a presentation environment has access to information being evaluated.

In an aspect, the complementary calendar may be constructed based upon sensor data associated with a user of a device. For example, a social network profile (e.g., social network posts, social network messages, a user profile indicating hobbies or interest of the users) may be evaluated to identify an activity of the user as a particular sensor data. In another example, a context of the user's device may be evaluated to identify an activity of the user as the sensor data (e.g., a device location may be indicative of the user going to soccer practice at a soccer field on Tuesdays; a device location check-in may be indicative of the user going out on a movie date on Sundays (e.g., the user may check-in through a social network); a connectivity state, such as Wi-Fi connectivity, may indicate that the user is at home, in the office, or at a coffee shop; a charging state, such as a car charging state, may indicate that the user is currently driving; a vacation itinerary file on the device may indicate that the user will be going on a vacation in a week).

In particular, user account(s) and activity data 248 can include data regarding user emails, texts, instant messages, calls, and other communications; social network accounts and data, such as news feeds; online activity; calendars, appointments, or other user data that may have relevance for determining unaddressed events; user availability; and importance, urgency, or notification logic. Aspects of user account(s) and activity data 248 may store information across one or more databases, knowledge graphs, or data structures. The account information may be used to access private information.

Turning now to FIGS. 3A and 3B, an exemplary notification interface is shown, in accordance with an aspect of the technology described herein. Client device 300 displays a notification interface 310A. The notification interface 310A includes notification content 311 "you committed to bring a book home today." The notification content 311 has not been augmented and represents the type of notification a user would receive without benefit of the technology described herein. This notification could have been extracted from a text message the user sent to a spouse. A text message, such as, "got your voice mail, I won't forget to bring the book home today," could result in generation of the notification message. The notification may include a link to the source of the task (e.g., an email or text message) or otherwise identify the source of the task. This description may be derived by a task identification model analyzing one or more communications received or sent by the user. The notification interface 310A also includes three action buttons. The first action button 312 offers to provide the user directions to home. The second action button 314 offers to create a calendar entry to remind the user to bring the book home. The third action button 316 allows the user to dismiss the task reminder. FIG. 3A depicts just one potential notification interface and the number and specific buttons can vary based on the type of task identified, and the particular device capabilities.

Aspects of the technology may determine that the notification content 311, "you committed to bring a book home today," satisfies an augmentation criterion. In one aspect, the criterion could identify the object (e.g., book) of the notification content and determine that "book" is a common noun that could be made more informative if replaced by a proper noun. In this example, the criterion could be rule-based. Any time a common noun is used, then the criterion for augmentation can be satisfied. As used herein, a common noun is a noun that refers to people, places, or things in general (e.g., city, book, movie, file). In contrast, a proper noun is a name that identifies a specific person, place, or thing.

When the augmentation criterion is satisfied, aspects of the technology seek additional information, such as a word, to include in the notification content that can make the notification content more informative. In this case, the content can be made more informative by replacing "book" 320 with the title of the book. In one aspect, a domain for the notification is determined. Domains are used to reduce the world of communications and records to analyze in order to determine the content to include in the updated notification. Machine classifiers can be used to select the domain. The machine classifiers can take notification content, along with communications from which notification content was generated as input. The domains can be broad, (e.g., work, social, personal finance) or more specific (e.g., work/project team A, work/project team B, social/running club, social/fantasy baseball). Various files, data records, communications, and other information can be similarly classified by domain. In this case, a commitment to bring a book home may be classified into the social domain.

Once the domain is identified, candidate words related to books can be extracted from records associated with domain. In one aspect, the candidate words are mentions extracted using a co-referencing algorithm. In this case, the book title *Seabiscuit* can be extracted from an email to the user's personal email account from a library confirming that the user checked out the book *Seabiscuit*. Other information, such as the due date of the book can be extracted from the email. Other book titles taken from personal communications, social media posts, or other records could also be extracted for evaluation. Domain specific machine learning systems may be employed to assign augmentation scores to different candidate words. In this example, the book title *Seabiscuit* receives the highest augmentation score and is selected for inclusion in the notification content. In addition to receiving the highest score, the word may satisfy other secondary criteria, such as having an augmentation score above a threshold for inclusion. Another secondary criterion can be having an augmentation score greater than a threshold amount higher than the second highest augmentation score.

The result of the inclusion can be seen in FIG. 3B, where the phrase "a book" 320 is replaced with "*Seabiscuit*" 322. In one aspect, inclusions in a notification content 313 are annotated to indicate to the user that a modification to the original notification content 313 has been made. In this case, *Seabiscuit* 322 is underlined. However, other types of annotation, such as italics, highlighting, and color variation may be used, or sounds, in the case of audio notifications, as described in FIGS. 3E and 3F. In one aspect, the source(s) of the augmentation, may be accessed by selecting the included word. In this case, the user may be brought to the library email upon selecting *Seabiscuit*. In one aspect, selecting an inserted word can provide additional information, such as other candidate words. For example, the system may determine that "a book" could plausibly be referring to three different candidate book titles, but that *Seabiscuit* received the highest confidence score. In this case, upon receiving a user selection of *Seabiscuit*, the two books with the second and third highest confidence scores could be displayed. The user could be given the option of selecting one of the other titles to replace *Seabiscuit* and generate an updated notification. In one aspect, alternative candidates are only provided when the alternative candidates have above a threshold confidence score.

In some embodiments, such as shown in the example of FIG. 3B, the notification may include a dedicated pointer, link, or menu option or similar access means to additional details 315 about the augmented notification. For example, by clicking on or selecting item 315, a user may be provided with details about the source(s) of the augmentation, such as the library email. Further, in some embodiments, the user may edit the sources, modify information in the sources, such as correcting an error, or specify how the sources are used. For instance, as described in the example of previous paragraph, a user may replace the title *Seabiscuit* with another title. In some embodiments, a user may provide feedback such as an indication of whether a particular source should be considered for deriving information for the augmentation, which then may be utilized in subsequent determinations for sources to be considered. For instance, based on this user feedback, a confidence level for a particular source or type of source may be increased or decreased.

Figure 3D:
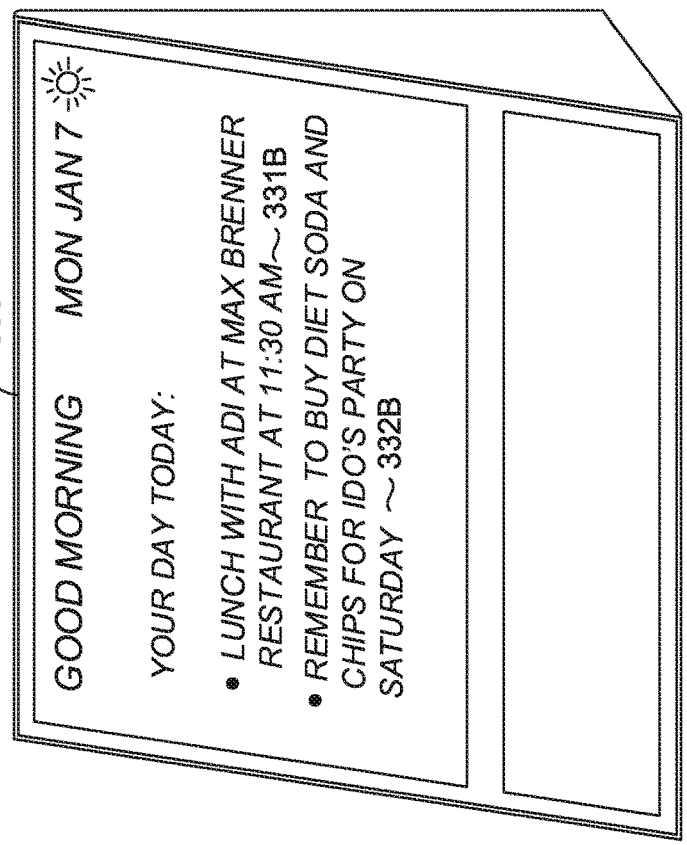
Figure 3C:
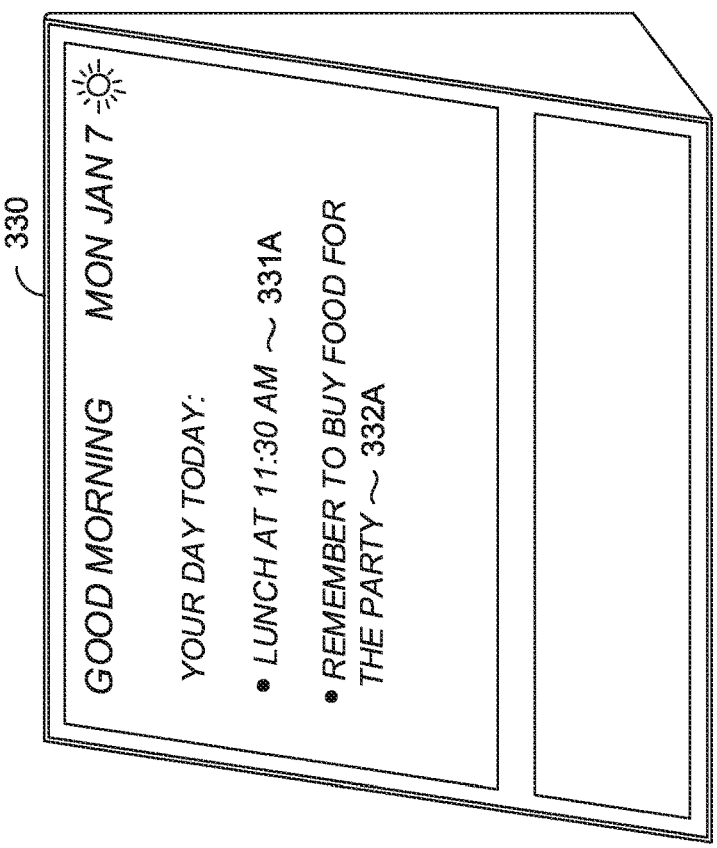

Turning now to FIGS. 3C and 3D, an exemplary notification interface is shown, in accordance with an aspect of the technology described herein. Client device 330 displays a notification interface with two notifications. The first notification 331A reminds the user of "Lunch at 11:30 AM." The second notification 332A reminds the user, "Remember to buy food for the party." The two notifications 331A and 332A have not been augmented and represent the type of notifications a user would receive without benefit of the technology described herein. These notifications could be derived from different sources. For example, the lunch notification 331A could have been extracted from a text message the user sent to a spouse. A text message, such as, "It's a date. Lunch tomorrow at 11:30," could result in generation of the notification message. The second notification 332A could be from a response provided in a fillable form in a web portal, app, or email when replying to a party invite. In both cases, additional information could be used to improve the notifications.

FIG. 3D shows augmented notifications 331B and 332B. The first augmented notification 331B reminds the user of "Lunch with Adi at Max Brenner Restaurant at 11:30 AM." The second augmented notification 332B reminds the user, "Remember to buy diet soda and chips for Ido's party on Saturday."

The additional content in the first augmented notification 331B may be derived from a corpus of data. The corpus of data can include other user communications, application data, file data, and the like. In this example, the lunch notification 331A was derived from a text message, "It's a date. Lunch tomorrow at 11:30." Other communications within a chain of text messages between the two users may be added to the corpus for evaluation. Communications in other channels, such as social messages, emails, or transcribed spoken conversations between the two people who sent and received the lunch text message may be added to the corpus for analysis. Application data for restaurant reservation applications may be accessed upon determining that a meal is mentioned in the original notification content. In this example, the name of the restaurant may be identified from application data making reservations at 11:30 for two on the day in question. The recipient of the text message, in this case Adi, can be used to describe with whom the sender is having lunch. The technology maintains the context of the communication by mapping individuals who sent different messages to the actions in the messages. For example, the technology will determine that the text message was to Adi and infer that the sender is committing to lunch with Adi. This is just one example of the sources for additional information to from which additional notification content can be extracted. In some cases, the same information may be available in more than one source.

The additional content in the second augmented notification 332B may be derived from a corpus of data. The original notification 332A may have been derived from information entered into a fillable form in a web portal or app, or other communication such as when replying to a party invite. The augmented information can be from other sources, such as email, texts, and social messages. Such follow up communications occur often when users are planning parties of social events. For example, a group of friends may determine to have a party, and then—over a series of subsequent planning communications or conversations—work out when the party will occur (e.g., Saturday night) and who will be responsible for different aspects of the party, such as specific food items or entertainment. Sometimes these subsequent planning communications can be annoying for a particular user by requiring the user to navigate all of the communications in order to determine what they are responsible for bringing to the party. But as shown in item 332B of FIG. 3D, this problem is solved using the technologies described herein. In particular, the additional information derived from these other sources, including the subsequent planning communication, modifies the original notification by, in this example, specifying the type of food and additional details about the party to form the second augmented notification 332B.

Turning now to FIGS. 3E and 3F, an exemplary audible notification interface within a car 340 is shown, in accordance with an aspect of the technology described herein. In this example, speech generation (e.g., speech synthesis or a text-to-speech process) may be utilized to provide a spoken, audio notification to a user. In FIG. 3E, the in-car speaker 342, which may comprise a smart speaker computing device, audibly outputs a first notification 341A, "Remember to buy food for the party." This notification has not been augmented. In FIG. 3F, the in-car speaker 342 audibly outputs a first augmented notification 341B, "Remember to buy diet soda and chips for Ido's party on Saturday." A similar first notification and first augmented notification was described previously. FIGS. 3E and 3F illustrate an audible version of augmented notifications that could be output for display in other scenarios. In some embodiments, the audio of the augmented notification 341B may be modified to indicate the portions of the notification that are augmented, for example by modifying properties of the audio or including an additional audio indication (such as a sound) to enable the listening user to distinguish the portions of the audio notification that are annotated.

Figure 3G:
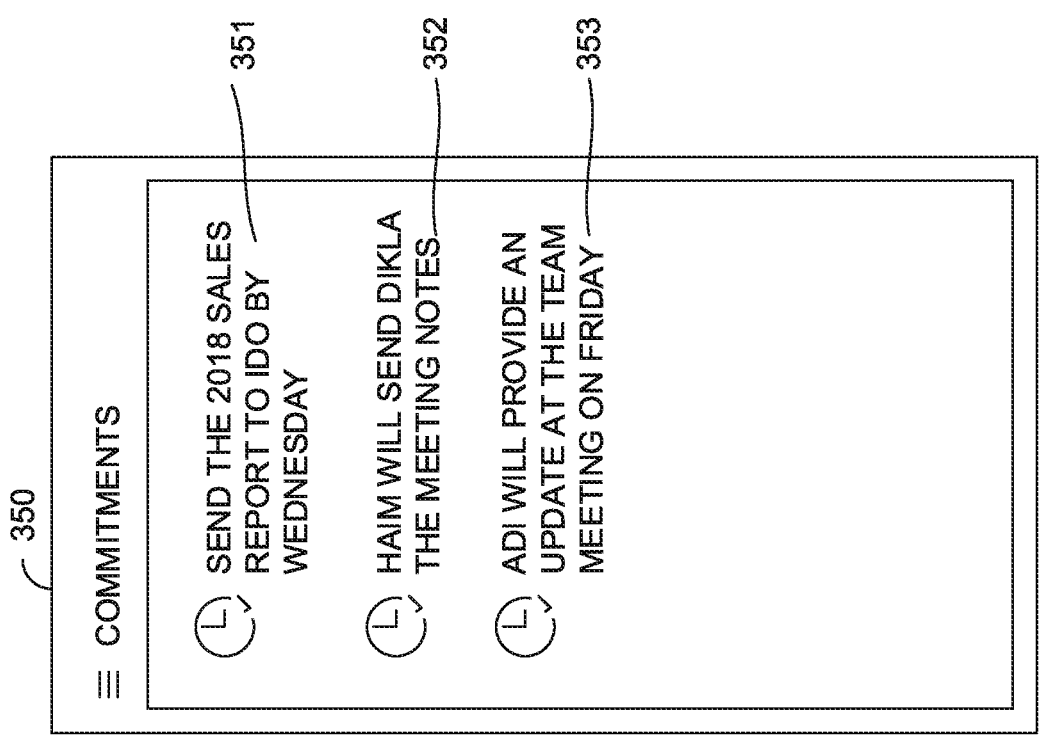

Turning now to FIG. 3G, an exemplary commitment interface 350 is shown, in accordance with an aspect of the technology described herein. The exemplary commitment interface 350 may be displayed on a phone, tablet, or other client device. In this example, the exemplary commitment interface is associated with a user named Annette. Aspects of the technology may augment notification content in different ways for different users even when the notification content originates from the same communication or other source. The technology preserves the conversation context in order to understand the various people performing actions and the user's relationship to each other. For example, the technology may understand the hierarchy within a business organization, social relationships, and the like. The commitment interface 350 shows a first augmented notification 351, a second augmented notification 352, and a third augmented notification 353.

The first augmented notification 351 reminds the Annette to "send the 2018 sales report to Vito by Wednesday." In order to generate the first augmented notification 351, the technology may collect a corpus of communications between Annette, Vito, and others that are related to a communication from which the notification 351 originated. For example, Annette's file access records can be analyzed to determine that she has been working on the sales report and learn that the drafts of the sales report have been communicated by Annette to Vito previously.

The second augmented notification 352 indicates that "Haim will send Dikla the meeting notes." In this example, Annette can be on a team with Haim and Dikla and have an interest in the meeting notes. In this case, the original notification could simply indicate, "send it to Dikla." If this notification is not augmented by adding the sender, then it is unclear who should send the meeting notes. Even though the notification 352 is communicated to Annette, the augmentation adds the correct third person with responsibility to send the notes. In fact, Dikla, Haim, and Annette could all receive notifications that have been augmented in different ways. For example, "send it" becomes "Send the sales report to Dikla" for Haim; "Haim will send the sales report to you" for Dikla; and "Haim will send the sales report to Dikla" for Annette.

The third augmented notification 353 is similar. The third augmented notification 353 indicates that, "Adi will provide an update at the team meeting on Friday." Again, clarifying who is performing the action is critical to understanding the notification.

Figure 4:
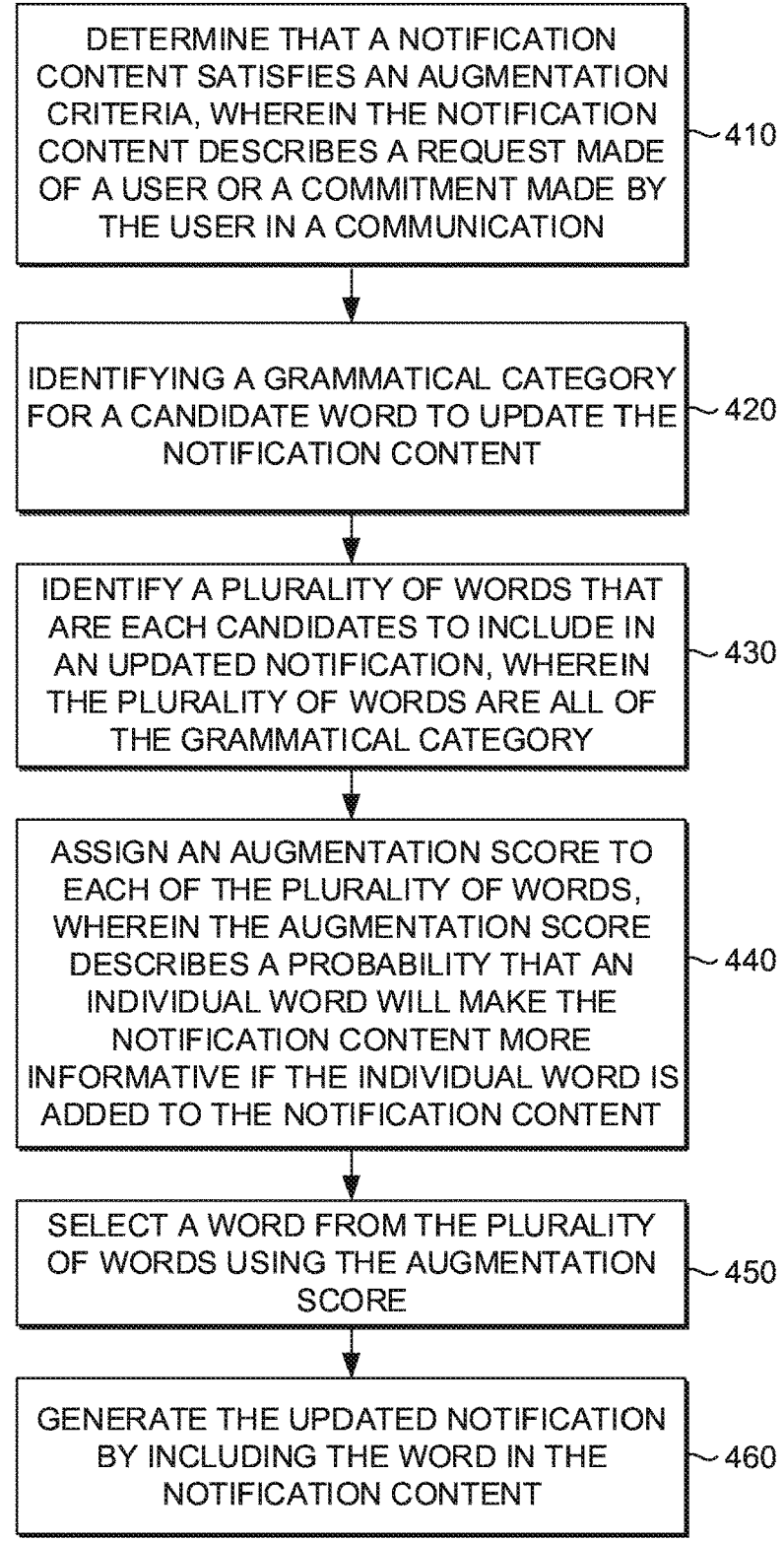
FIGS. 4-6 depict flow diagrams of methods for augmenting notification details, in accordance with an aspect of the technology.

Turning now to FIG. 4, a method 400 for augmenting a notification is provided. Method 400 can be performed by a computing system, such as system 200 described previously.

At step 410, a notification content is determined to satisfy an augmentation criterion. The notification is generated from a communication to a user, such as a text message, social post, calendar invite, or email. The augmentation criterion can take the form of a rules-based approach, machine learning based approach, or a combination of the two. A machine learning based approach can assign a classification to a notification as augmentable or not augmentable. When the machine learning method assigns a notification as augmentable then the augmentation criteria is satisfied. The machine learning method can be trained using human annotated notifications. The human annotated notifications can be given an augmentation score or some other indication used to determine whether more information may be added to the notification content. The machine learning mechanism is then trained using the human annotated notifications and is able to assign an augmentation score to an unlabeled notification when fully trained. Use of different machine learning-processes are possible in different aspects, including supervised learning processes (e.g., decision tree, random forest, logistic regression), unsupervised learning (e.g., apriori algorithm, K-means), or reinforcement learning.

The rules-based approach can look for specific keywords or the absence of certain words in the presence of other words to determine that a trigger criteria is satisfied. For example, the presence of a pronoun or common noun in the notification can satisfy the augmentation criteria. The presence of a first name without a last name or a day without a date may satisfy the augmentation criteria.

At step 420, a grammatical category for a candidate word to update the notification content is selected. In one aspect, a grammatical analysis can be used to determine the grammatical category of a word to be added. For example, if the original notification lacks an object, then the grammatical category of the object, for example, a person, place, or thing may be determined. In one aspect, the grammatical category is determined using a machine learning method. A corpus of exemplary notifications is provided to the machine learning system for training purposes. The grammatical category of each word in the notification may be noted in the training data. The machine learning system can identify grammatical patterns that commonly occur in notifications. Using this understanding, the most likely grammatical category for a word to be added to a notification can be determined taking the existing notification as input.

In one aspect, various rules are used to look for words in the grammatical category that may be suitable for inclusion in the notification. For example, an augmentation rule used to satisfy the augmentation criteria can be used to identify specific words to look for. For example, if the word "file" is mentioned in the notification, then names of various files accessible by the user can be retrieved as candidates. Words grammatically classified as a thing (e.g., file) may be selected, while all others are excluded. Similarly, if a person's last name is absent from the notification, every last name that goes with a known first name in the notification can be extracted from the user's contact list, emails, social network, or other data source. In this case, the grammatical category would be proper name.

At step 430, a plurality of words that are each candidates to include in an updated notification is identified. The plurality of words may all be of the grammatical category and can be extracted from user data.

At step 440, an augmentation score is assigned to each of the plurality of words. The augmentation score describes a probability that an individual word make the notification content more informative if the individual word is added to the notification content. Use of different machine learning-processes are possible in different aspects, including supervised learning processes (e.g., decision tree, random forest, logistic regression), unsupervised learning (e.g., apriori algorithm, K-means), or reinforcement learning. In each case, information about the word, notification, user, and related context can be used as an input to determine the augmentation score. The machine learning process is first trained. For example, a corpus of information may be manually scored or labeled along an augmentation score spectrum by people. A machine learning system trained on the corpus of labeled information could use natural language processing to assign a score along the same augmentation score spectrum to an unlabeled candidate word.

At step 450, a word is selected from the plurality of words using the augmentation score. Various methods can be used to select the word. In one aspect, the word with the highest score is selected. In another aspect, the word with the highest score is only selected when the augmentation score for the word satisfies an augmentation threshold. The augmentation threshold can represent a confidence that the word goes with the notification. The use of an augmentation threshold can prevent the addition of a word to a notification that may be inaccurate and actually make the notification worse. For example, it would be better not to add the wrong last name to the notification then to leave it as is. The augmentation threshold can serve as a gatekeeper to make sure words are only added to a notification when there is a higher confidence level that the word belongs in the notification.

In another aspect, the word with the highest score is only selected when no other word has an augmentation score within a threshold range from the word's augmentation score. In some aspects, two or more words may seem to fit into the context of a notification. For example, a user may work with three different men named Bob. A notification for a work related task deliverable to Bob could be identified as augmentable for lacking a last name. However, the presence of multiple candidate last names may cause similar augmentation scores to be given to one or more of the candidate last names. Even if both of the scores exceed the threshold, neither may be selected when the two scores are similar (e.g., within a range that defines "similar") because uncertainty can exist as to which word to add to the notification.

Various actions can be taken in response to determining that two or more words are viable candidates to make a notification more informative. If both words are names for the same type of object, such as a presentation file (e.g., December business plan presentation and November business plan presentation), then the object can be used instead of the two words to augment a notification. In this example, presentation or presentation file could be used as the word.

In one aspect, a single word that encompasses the meaning of both words is selected if it is more informative than the original word in the notification. For example, in the original notification to "send it to Bob," "it" could be referring to either a March 1 presentation or a March 15 presentation. In this example, the word "presentation" is more descriptive than "it" and encompasses the meaning of both the March 1 presentation and the March 15 presentation. In this case, the notification could be updated to read, "send the presentation to Bob."

As a variation, the two specific words could be added as a parenthetical. The updated notification including the parenthetical could read, "send the presentation (March 1 presentation or March 15 presentation) to Bob." The user is then alerted that some uncertainty exists as to the meaning of presentation.

At step 460, the updated notification is generated by including the word in the notification content. If the original notification is "send it to Bob on December 8" then the updated notification could be "send a presentation file to Bob on December 8." This notification is generated by replacing the pronoun "it" with "the presentation file." The selected word may be added by substitution or addition. For example, a pronoun may be substituted for a common noun or a proper noun. Similarly, a common noun may be substituted for a proper noun. In other examples, the word is added without subtracting existing words. For example, if the word is a person's last name when the first name is already in the notification then the last name may simply be added. The added words may be annotated, as described with reference to FIG. 3. Upon selecting one of the added words, additional information such as the source material from which the word was extracted, may be shown to the user. Other changes to the notification are possible. For example, the notification content could be made more informative by grammatically updating the notification content. For example, a notification could be changed from the passive voice to the active voice.

Figure 5:
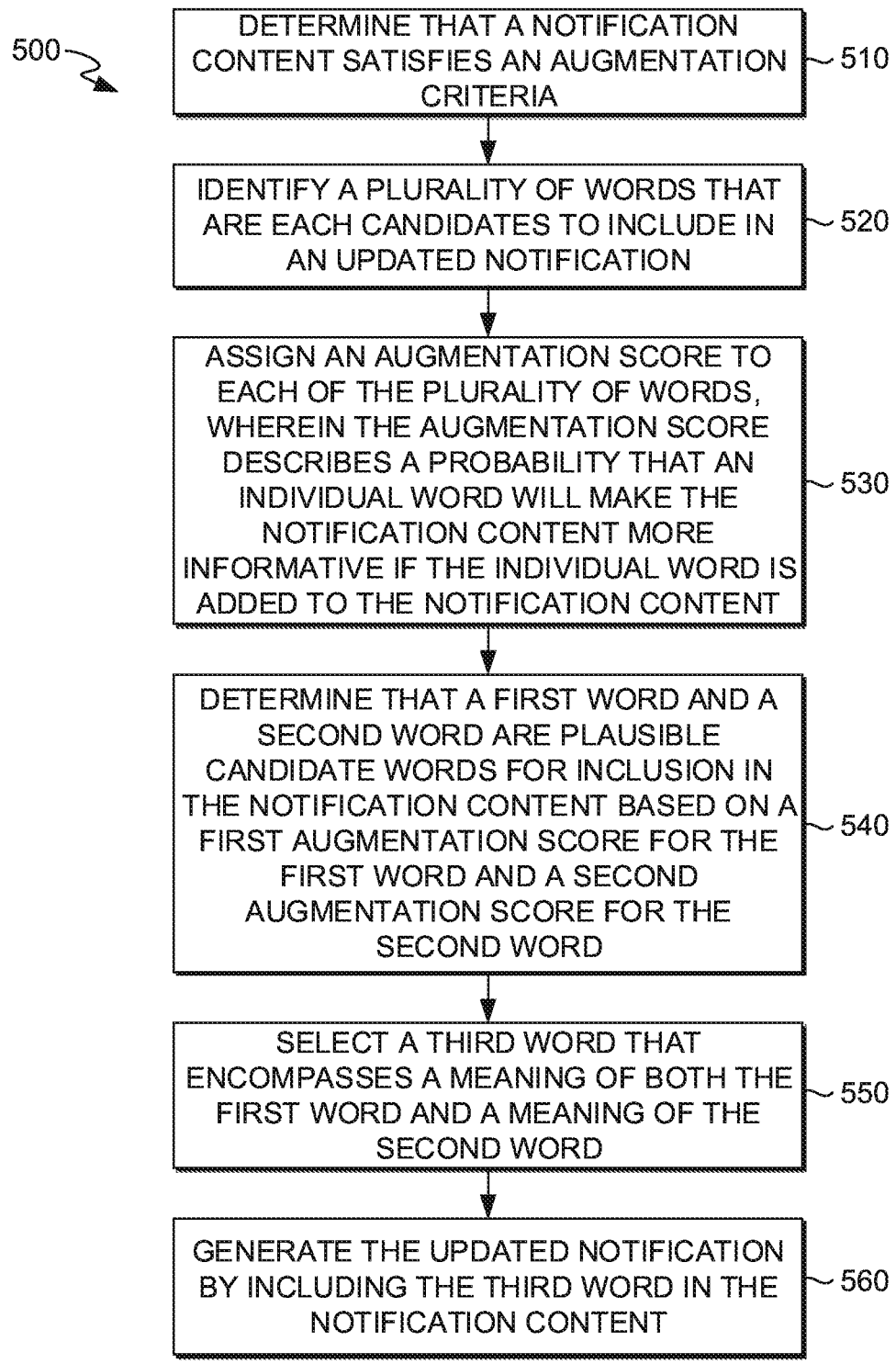

Turning now to FIG. 5, a method 500 for augmenting a notification is provided. Method 500 can be performed by a computing system, such as system 200 described previously.

At step 510, a notification content is determined to satisfy an augmentation criterion. The notification can be generated from a communication to a user, such as a text message, social post, calendar invite, or email. The notification could be generated from words spoken during a meeting, including during a virtual meeting. The notification is generated from a communication to a user, such as a text message, social post, calendar invite, or email. The augmentation criterion can be determined to be satisfied using a rules-based approach, machine learning based approach, or a combination of the two. A machine learning based approach can assign a classification to a notification as augmentable. When the machine learning method assigns a notification as augmentable then the augmentation criterion is satisfied. The machine learning method can be trained using human annotated notifications. The human annotated notifications can be given an augmentation. The machine learning mechanism is then trained using the human annotated notifications and is able to assign an augmentation score to an unlabeled notification when fully trained. Use of different machine learning-processes are possible in different aspects, including supervised learning processes (e.g., decision tree, random forest, logistic regression), unsupervised learning (e.g., apriori algorithm, K-means), or reinforcement learning.

The rules-based approach can look for specific keywords or the absence of certain words in the presence of other words to determine that a trigger criteria is satisfied. For example, the presence of a pronoun or common noun in the notification can satisfy the augmentation criteria. The presence of a first name without a last name or a day without a date may satisfied the augmentation criteria.

At step 520, a plurality of words that are each candidates to include in an updated notification is identified. The words can be taken from user communications, files, social media, semantic records, a knowledge base, or any other data source associated with the user. The plurality of words is intended to be overly inclusive. However, various filters can be used to make sure that the plurality of words includes many viable candidates for inclusion in an updated notification, while not including unlikely candidates. A different group of words may be generated for each cause of uncertainty in an original notification. For example, a notification including two different pronouns could cause two different plurality of words to be generated, one plurality for each pronoun.

Various methods can be used to generate the plurality of words. In one aspect, a grammatical analysis can be used to determine the grammatical category of a word to be added. For example, if the original notification lacks an object, then the grammatical category of the object, for example, as a person, place, or thing may be determined and only words that fit the grammatical category identified as candidates. In one aspect, the grammatical categories are determined using machine learning. A corpus of exemplary notifications is provided to the machine learning system. The grammatical category of each word in the notification may be noted in the training data. The machine learning system can identify grammatical patterns that commonly occur in notifications. Using this understanding, the most likely grammatical category for a word to be added can be determined taking the existing notification as input.

In one aspect, various rules are used to look for words that may be suitable for inclusion in the notification. For example, a rule used to satisfy the augmentation criteria can be used to identify specific words to look for. For example, if a file is mentioned, the names of various files accessible by the user can be retrieved as candidates. Similarly, if a person's last name is absent from the notification, every last name that goes with a known first name in the notification can be extracted from the user's contact list, emails, social network, or other data source.

At step 530, an augmentation score is assigned to each of the plurality of words. The augmentation score describes a probability that an individual word make the notification content more informative if the individual word is added to the notification content. Use of different machine learning-processes are possible in different aspects, including supervised learning processes (e.g., decision tree, random forest, logistic regression), unsupervised learning (e.g., apriori algorithm, K-means), or reinforcement learning. In each case, information about the word, notification, user, and related context can be used as an input to determine the augmentation score. The machine learning process is first trained. For example, a corpus of information may be manually scored or labeled along an augmentation score spectrum by people. A machine learning system trained on the corpus of labeled information could use natural language processing to assign a score along the same augmentation score spectrum to an unlabeled candidate word.

At step 540, a first word and a second word are determined to be plausible candidate words for inclusion in the notification content based on a first augmentation score for the first word and a second augmentation score for the second word. In one aspect, neither the first augmentation score nor the second augmentation score satisfies a threshold confidence to include the first or second word in the updated notification.

At step 550, a third word that encompasses a meaning of both the first word and a meaning of the second word is selected. In one aspect, a single word that encompasses the meaning of both words is selected if it is more informative than the original word in the notification. For example, in the original notification to "send it to Bob," "it" could be referring to either a March 1 presentation or a March 15 presentation. In this example, the word "presentation" is more descriptive than "it" and encompasses the meaning of both the March 1 presentation and the March 15 presentation. In this case, the notification could be updated to read, "send the presentation to Bob."

As a variation, the two specific words could be added as a parenthetical. The updated notification including the parenthetical could read, "send the presentation (March 1 presentation or March 15 presentation) to Bob." The user is then alerted that some uncertainty exists as to the meaning of "presentation."

At step 560, the updated notification is generated by including the third word in the notification content. The selected word may be added by substitution or addition. For example, a pronoun may be substituted for a common noun or a proper noun. Similarly, a common noun may be substituted for a proper noun. In other examples, the word is added without subtracting existing words. For example, if the word is a person's last name when the first name is already in the notification then the last name may simply be added. The added words may be annotated, as described with reference to FIG. 3. Upon selecting one of the added words, additional information such as the source material from which the word was extracted, may be shown to the user. Other changes to the notification are possible. For example, the notification content could be made more informative by grammatically updating the notification content. For example, a notification could be changed from the passive voice to the active voice.

Figure 6:
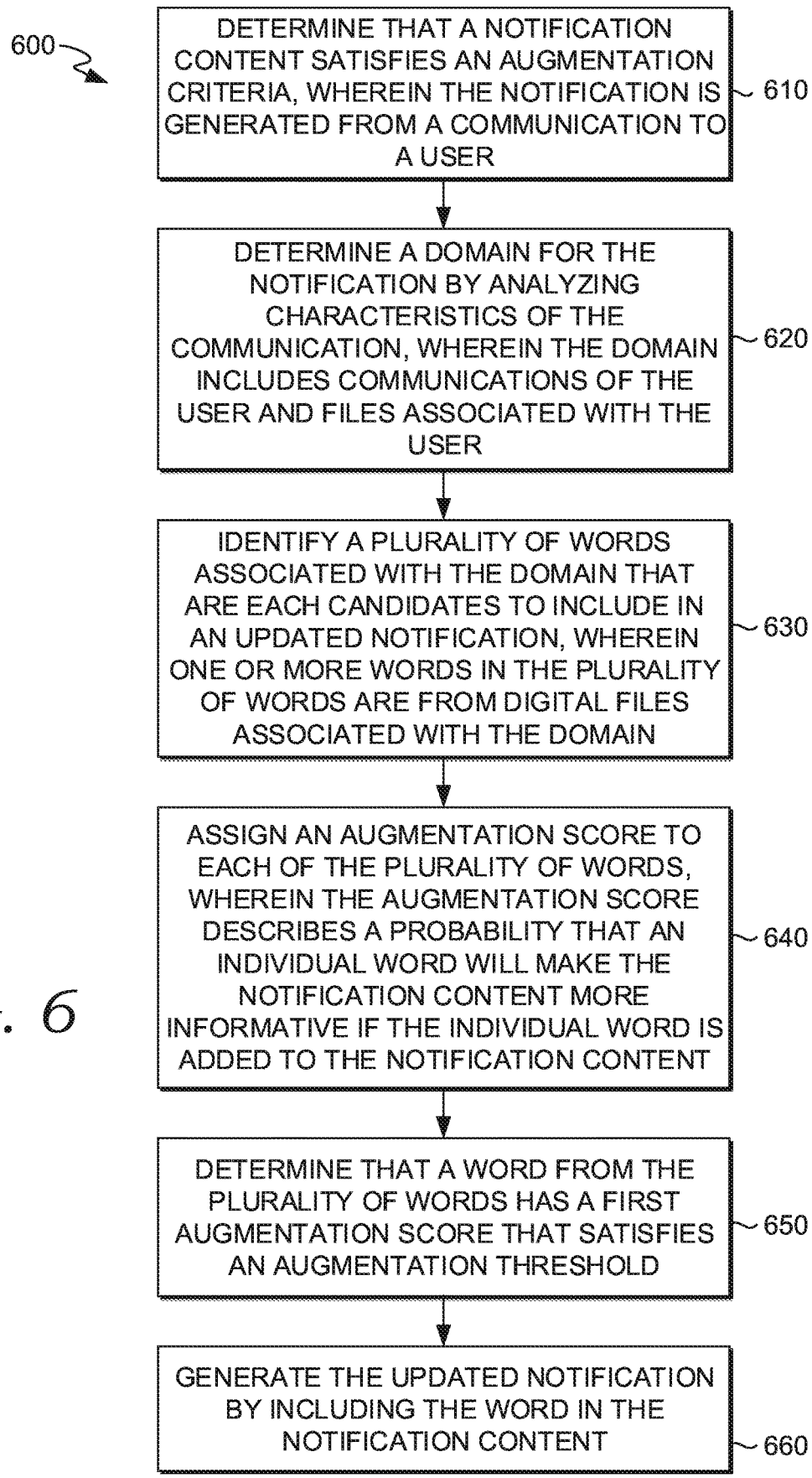

Turning now to FIG. 6, a method 600 for augmenting a notification is provided. Method 600 can be performed by a computing system, such as system 200 described previously.

At step 610, a notification content is determined to satisfy an augmentation criterion. The notification is generated from a communication to a user, such as a text message, social post, calendar invite, or email. The notification is generated from a communication to a user, such as a text message, social post, calendar invite, or email. The augmentation criterion can be determined to be satisfied using a rules-based approach, machine learning based approach, or a combination of the two. A machine learning based approach can assign a classification to a notification as augmentable. When the machine learning method assigns a notification as augmentable then the augmentation criteria is satisfied. The machine learning method can be trained using human annotated notifications. The human annotated notifications can be given an augmentation score. The machine learning mechanism is then trained using the human annotated notifications and is able to assign an augmentation score to an unlabeled notification when fully trained. Use of different machine learning-processes are possible in different aspects, including supervised learning processes (e.g., decision tree, random forest, logistic regression), unsupervised learning (e.g., apriori algorithm, K-means), or reinforcement learning.

The rules-based approach can look for specific keywords or the absence of certain words in the presence of other words to determine that a trigger criteria is satisfied. For example, the presence of a pronoun or common noun in the notification can satisfy the augmentation criteria. The presence of a first name without a last name or a day without a date may satisfy the augmentation criteria.

At step 620, a domain is determined for the notification by analyzing characteristics of the communication. The domain includes communications of the user and files associated with the user. Use of different machine learning-processes are possible in different aspects, including supervised learning processes (e.g., decision tree, random forest, logistic regression), unsupervised learning (e.g., apriori algorithm, K-means), or reinforcement learning. In each case, the notification content and other information associated with the notification is used as an input to determine the notification domain. For example, a corpus of notification information may be manually scored or labeled according to domain (e.g., work, social, hobby). A machine classification system trained on the corpus of labeled information could use natural language processing to assign a domain to an unlabeled notification. Alternatively, the domain could be identified using rules, such as keyword identification.

At step 630, a plurality of words associated with the domain that are each candidates to include in an updated notification is identified. One or more words in the plurality of words are from digital files associated with the domain.

At step 640, an augmentation score is assigned to each of the plurality of words. The augmentation score describes a probability that an individual word make the notification content more informative if the individual word is added to the notification content. Use of different machine learning-processes are possible in different aspects, including supervised learning processes (e.g., decision tree, random forest, logistic regression), unsupervised learning (e.g., apriori algorithm, K-means), or reinforcement learning. In each case, information about the word, notification, user, and related context can be used as an input to determine the augmentation score. The machine learning process is first trained. For example, a corpus of information may be manually scored or labeled along an augmentation score spectrum by people. A machine learning system trained on the corpus of labeled information could use natural language processing to assign a score along the same augmentation score spectrum to an unlabeled candidate word.

At step 650, a word from the plurality of words is determined to have a first augmentation score that satisfies an augmentation threshold. Various methods can be used to select the word. In one aspect, the word with the highest score is selected. In another aspect, the word with the highest score is only selected when the augmentation score for the word satisfies an augmentation threshold. The augmentation threshold can represent a confidence that the word goes with the notification. The use of an augmentation threshold can prevent the addition of a word to a notification that may be inaccurate and actually make the notification worse. For example, it would be better not to add the wrong last name to the notification then to leave it as is. The augmentation threshold can serve as a gatekeeper to make sure words are only added to a notification when there is a higher confidence level that the word belongs in the notification.

In another aspect, the word with the highest score is only selected when no other word has an augmentation score within a threshold range from the word's augmentation score. In some aspects, two or more words may seem to fit into the context of a notification. For example, a user may work with three different men named Bob. A notification for a work related task deliverable to Bob could be identified as augmentable for lacking a last name. However, the presence of multiple candidate last names may cause similar augmentation scores to be given to one or more of the candidate last names. Even if both of the scores exceed the threshold, neither may be selected when the two scores are similar (e.g., within a range that defines "similar") because uncertainty can exist as to which word to add to the notification.

Various actions can be taken in response to determining that two or more words are viable candidates to make a notification more informative. If both words are names for the same type of object, such as a presentation file (e.g., December business plan presentation and November business plan presentation), then the object can be used instead of the two words to augment a notification. In this example, presentation or presentation file could be used as the word.

In one aspect, a single word that encompasses the meaning of both words is selected if it is more informative than the original word in the notification. For example, in the original notification to "send it to Bob," "it" could be referring to either a March 1 presentation or a March 15 presentation. In this example, the word "presentation" is more descriptive than "it" and encompasses the meaning of both the March 1 presentation and the March 15 presentation. In this case, the notification could be updated to read, "send the presentation to Bob."

As a variation, the two specific words could be added as a parenthetical. The updated notification including the parenthetical could read, "send the presentation (March 1 presentation or March 15 presentation) to Bob." The user is then alerted that some uncertainty exists as to the meaning of "presentation."

At step 660, the updated notification is generated by including the word in the notification content. The notification editor 288 generates an updated notification by adding the selected word to the notification. The selected word may be added by substitution or addition. For example, a pronoun may be substituted for a common noun or a proper noun. Similarly, a common noun may be substituted for a proper noun. In other examples, the word is added without subtracting existing words. For example, if the word is a person's last name when the first name is already in the notification then the last name may simply be added. The added words may be annotated, as described with reference to FIG. 3. Upon selecting one of the added words, additional information such as the source material from which the word was extracted, may be shown to the user. Other changes to the notification are possible. For example, the notification content could be made more informative by grammatically updating the notification content. For example, a notification could be changed from the passive voice to the active voice.

Figure 7:
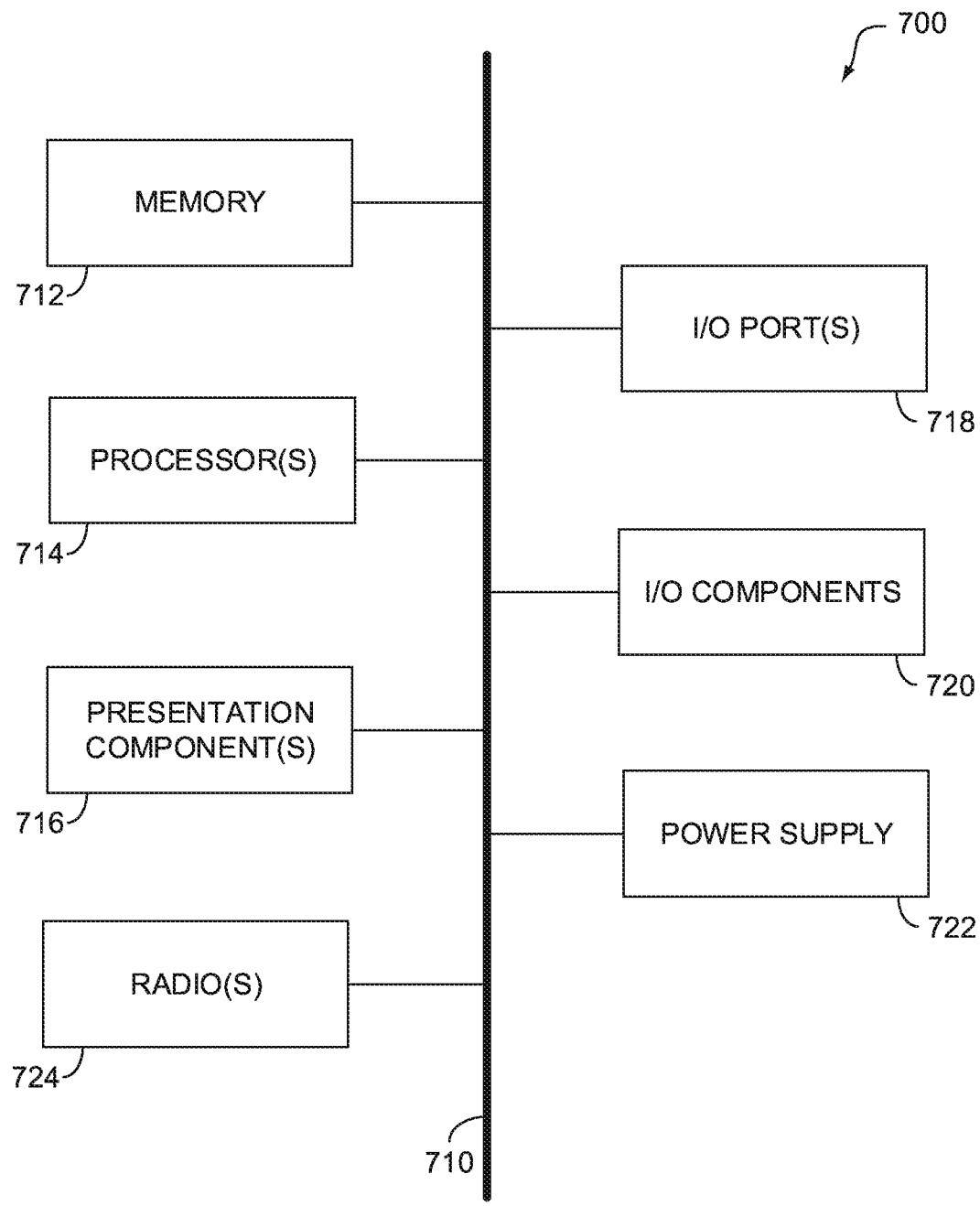
FIG. 7 is a block diagram of an exemplary computing environment suitable for use in implementing an aspect of the technology.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more aspects of the present technology. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc.

The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some aspects of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a BLUETOOTH connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method for augmenting a notification, comprising:
   detecting that a word is absent from the notification;
   in response to the detecting, initiating an augmentation of a notification content to add the word;
   identifying a grammatical category for a candidate word to update the notification content;
   identifying a plurality of words in the grammatical category that are each candidates to include in an updated notification;
   assigning an augmentation score to each of the plurality of words using a machine learning model, wherein the augmentation score describes a probability that an individual word will make the notification content more informative if the individual word is added to the notification content;
   determining that a first word and a second word from the plurality of words are plausible candidate words for inclusion in the notification content based on a first augmentation score for the first word and a second augmentation score for the second word, and wherein the first augmentation score and the second augmentation score do not satisfy a selection threshold for use in the updated notification; and
   selecting as the word, a third word that encompasses a meaning of both the first word and a meaning of the second word; and
   generating the updated notification by including the word in the notification content.

2. The method of claim 1, wherein the first word and the second word are proper names of an object type and the third word is the object type.

3. The method of claim 1, further comprising outputting the updated notification through a user device.

4. The method of claim 1, further comprising determining a domain for the notification by analyzing characteristics of the communication, wherein the plurality of words are associated with the domain.

5. The method of claim 4, wherein the domain includes a subset of files accessible by the user.

6. The method of claim 1, wherein including the word in the notification content comprises replacing a different word in the notification content with the word.

7. A method for augmenting a notification, comprising:
determining that a notification content satisfies an augmentation criteria;
identifying a plurality of words that are each candidates to include in an updated notification;
assigning an augmentation score to each of the plurality of words, wherein the augmentation score describes a probability that an individual word will make the notification content more informative if the individual word is added to the notification content;
determining that a first word and a second word are plausible candidate words for inclusion in the notification content based on a first augmentation score for the first word and a second augmentation score for the second word, wherein the first augmentation score and the second augmentation score are generated by a machine classifier trained using a corpus of scored notifications, and wherein the first augmentation score and the second augmentation score do not satisfy a selection threshold for use in the updated notification;
selecting a third word that encompasses a meaning of both the first word and a meaning of the second word; and
generating the updated notification by including the third word in the notification content.

8. The method of claim 7, wherein the augmentation criteria is an absence of a grammatical object in the notification.

9. The method of claim 7, wherein the first word and the second word are proper names of an object type and the third word is the object type.

10. The method of claim 7, wherein the augmentation criteria is a grammatical object of the notification content is a pronoun.

11. The method of claim 7, further comprising determining a domain for the notification by analyzing characteristics of a communication used to generate the notification, wherein the plurality of words are associated with the domain.

12. The method of claim 7, further comprising:
matching the notification content to a grammatical pattern observed in a corpus of other exemplary notifications;
using the grammatical pattern, identifying a grammatical category for a candidate word to update the notification content; and
wherein the plurality of words are all of the grammatical category.

13. The method of claim 7, wherein including the third word in the notification content comprises adding the third word to the notification content without removing words already in the notification.

14. The method of claim 7, wherein the notification content describes a request made of a user or a commitment made by the user in a communication.

15. One or more computer storage media comprising computer executable instructions that, when executed by a computing device, causes the computing device to perform a method of augmenting a notification, the method comprising:
determining that a notification content satisfies an augmentation criteria, wherein the notification is generated from a communication to a user;
identifying a plurality of words from the communication that are each candidates to include in an updated notification;
assigning an augmentation score to each of the plurality of words using a machine learning model, wherein the augmentation score describes a probability that an individual word will make the notification content more informative if the individual word is added to the notification content;
determining that a first word and a second word from the plurality of words are plausible candidate words for inclusion in the notification content based on a first augmentation score for the first word and a second augmentation score for the second word, and wherein the first augmentation score and the second augmentation score do not satisfy a selection threshold for use in the updated notification;
selecting a third word that encompasses a meaning of both the first word and a meaning of the second word; and
generating the updated notification by including the third word in the notification content.

16. The media of claim 15, wherein the augmentation criteria is a grammatical object of the notification content is a pronoun.

17. The media of claim 16, wherein including the word in the notification content comprises replacing the pronoun with the word.

18. The media of claim 15, wherein the method further comprises:
matching the notification content to a grammatical pattern observed in a corpus of other exemplary notifications;
using the grammatical pattern, identifying a grammatical category for a candidate word to update the notification content; and
wherein the plurality of words are all of the grammatical category.

* * * * *